(12) United States Patent
Li et al.

(10) Patent No.: US 11,302,064 B2
(45) Date of Patent: Apr. 12, 2022

(54) METHOD AND APPARATUS FOR RECONSTRUCTING THREE-DIMENSIONAL MODEL OF HUMAN BODY, AND STORAGE MEDIUM

(71) Applicant: TENCENT TECHNOLOGY (SHENZHEN) COMPANY LIMITED, Shenzhen (CN)

(72) Inventors: Chen Li, Shenzhen (CN); Hongwei Yi, Shenzhen (CN); Qiong Cao, Shenzhen (CN); Xiaoyong Shen, Shenzhen (CN); Yuwing Tai, Shenzhen (CN); Jiaya Jia, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 17/037,644

(22) Filed: Sep. 29, 2020

(65) Prior Publication Data
US 2021/0012558 A1    Jan. 14, 2021

Related U.S. Application Data

(63) Continuation of application No. PCT/CN2019/090885, filed on Jun. 24, 2019.

(30) Foreign Application Priority Data

Aug. 28, 2018 (CN) .......................... 201810990982.1

(51) Int. Cl.
*G06T 15/20* (2011.01)
*G06T 19/20* (2011.01)

(52) U.S. Cl.
CPC ............ *G06T 15/205* (2013.01); *G06T 19/20* (2013.01); *G06T 2219/2016* (2013.01); *G06T 2219/2021* (2013.01)

(58) Field of Classification Search
None
See application file for complete search history.

(56) References Cited

FOREIGN PATENT DOCUMENTS

| CN | 102054291 A | 5/2011 |
|----|-------------|--------|
| CN | 103593870 A | 2/2014 |

(Continued)

OTHER PUBLICATIONS

Yi, Hongwei, et al. "Mmface: A multi-metric regression network for unconstrained face reconstruction." Proceedings of the IEEE/CVF Conference on Computer Vision and Pattern Recognition. 2019.*

(Continued)

*Primary Examiner* — Tapas Mazumder
(74) *Attorney, Agent, or Firm* — Anova Law Group, PLLC

(57) ABSTRACT

Embodiments of this application disclose a method and an apparatus for reconstructing a three-dimensional model of a human body, and a storage medium. The method includes obtaining a two-dimensional image of a human body part to be reconstructed; mapping the two-dimensional image to a voxel space, to obtain a voxelized result of the two-dimensional image; obtaining three-dimensional morphable model parameters corresponding to the two-dimensional image based on calculating the voxelized result using a preset three-dimensional parameter regression network; and reconstructing a three-dimensional model of the human body part based on the three-dimensional morphable model parameters.

20 Claims, 8 Drawing Sheets

(56) References Cited

FOREIGN PATENT DOCUMENTS

| | | |
|---|---|---|
| CN | 107292269 A | 10/2017 |
| CN | 107292950 A | 10/2017 |
| CN | 107564049 A | 1/2018 |
| CN | 108062791 A | 5/2018 |
| CN | 108961384 A | 12/2018 |
| CN | 109285215 A | 1/2019 |

OTHER PUBLICATIONS

Morales, Araceli, Gemma Piella, and Federico M. Sukno. "Survey on 3D face reconstruction from uncalibrated images." Computer Science Review 40 (2021): 100400.*

The World Intellectual Property Organization (WIPO) International Search Report for PCT/CN2019/090885 dated Sep. 11, 2019 6 Pages (including translation).

The State Intellectual Property Office of the People's Republic of China (SIPO) Office Action 1 for 201810990982.1 dated Jan. 3, 2020 13 Pages (including translation).

Aaron S. Jackson et al., "Large Pose 3D Face Reconstruction from a Single Image via Direct Volumetric CNN Regression", 2017 IEEE International Conference on Computer Vision, Dec. 25, 2017 (Dec. 25, 2017), pp. 1034-1035. 11 pages.

Pengfei Dou et al., "End-to-end 3D face reconstruction with deep neural networks", 2017 IEEE International Conference on Computer Vision, Nov. 9, 2017 (Nov. 9, 2017), pp. 2-9. 12 pages.

Xiangyu Zhu et al., "Face Alignment Across Large Poses: A 3D Solution", 2016 IEEE International Conference on Computer Vision and Pattern Recognition, Dec. 12, 2016 (Dec. 12, 2016), p. 3. 12 pages.

The State Intellectual Property Office of the People's Republic of China (SIPO) Office Action 2 for 201810990982.1, Jun. 4, 2020 13 Pages (including translation).

Adrian Bulat et al., "Two-Stage Convolutional Part Heatmap Regression for the 1st 3D Face Alignment in the Wild (3DFAW) Challenge", In European Conference on Computer Vision, Springer, 2016. 9 pages.

Adrian Bulat et al., "How Far Are We From Solving the 2D & 3D Face Alignment Problem? (And a Dataset of 230,000 3D Facial Landmarks)", IEEE International Conference on Computer Vision (ICCV), 2017. 14 pages.

Chen Cao et al., "FaceWarehouse: A 3D Facial Expression Database for Visual Computing", IEEE Transactions on Visualization and Computer Graphics vol. 20 , Issue: 3 , Mar. 2014. 11 pages.

Chen Cao et al., "Real-time Facial Animation with Image-based Dynamic Avatars", ACM Trans. Graph.35, 4, Article 126, Jul. 2016. 12 pages.

Menglei Chai et al., "High-Quality Hair Modeling from a Single Portrait Photo", ACM Trans. Graph. 34, 6, Article 204 Oct. 2015. 10 pages.

Xuanyi Dong et al., "Supervision-by-Registration: An Unsupervised Approach to Improve the Precision of Facial Landmark Detectors", In Proceedings of the IEEE Conference on Computer Vision and Pattern Recognition (CVPR). 360-368. 9 pages.

P. Dou et al., "End-To-End 3D Face Reconstruction With Deep Neural Networks", In 2017 IEEE Conference on Computer Vision and Pattern Recognition (CVPR), 2017. 10 pages.

T. Hassner, "Viewing Real-World Faces in 3D", In 2013 IEEE International Conference on Computer Vision. 3607-3614. 8 pages.

T. Hassner et al., "Example Based 3D Reconstruction from Single 2D Images", In 2006 Conference on Computer Vision and Pattern Recognition Workshop (CVPRW), 2006. 8 pages.

Kaiming He et al., "Delving Deep into Rectifiers: Surpassing Human-Level Performance on ImageNet Classification", In Proceedings of the 2015 IEEE International Conference on Computer Vision (ICCV) (ICCV '15). IEEE Computer Society, Washington, DC, USA, 1026-1034. 9 pages.

Liwen Hu et al., "Avatar Digitization from a Single Image for Real-time Rendering", ACM Trans. Graph. 36, 6, Article 195, Nov. 2017. 14 pages.

Patrik Huber et al., "A Multiresolution 3D Morphable Face Model and Fitting Framework", In Proceedings of the 11th International Joint Conference on Computer Vision, Imaging and Computer Graphics Theory and Applications, Feb. 2016. 8 pages.

Aaron S. Jackson et al., "Large Pose 3D Face Reconstruction From a Single Image via Direct Volumetric CNN Regression", In The IEEE International Conference on Computer Vision (ICCV), 2017 9 pages.

Amin Jourabloo et al., "Large-Pose Face Alignment via CNN-Based Dense 3D Model Fitting", In Proceedings of the IEEE Conference on Computer Vision and Pattern Recognition, 2016. 9 pages.

Vahid Kazemi et al., "One Millisecond Face Alignment with an Ensemble of Regression Trees", In Proceedings of the 2014 IEEE Conference on Computer Vision and Pattern Recognition (CVPR), 2014. 8 pages.

Ira Kemelmacher-Shlizerman, "Internet-based Morphable Model", In International Conference on Computer Vision (ICCV), 2013. 7 pages.

Ira Kemelmacher-Shlizerman et al., "3D Face Reconstruction from a Single Image Using a Single Reference Face Shape", IEEE Transactions on Pattern Analysis and Machine Intelligence, vol. 33 , Issue: 2, Feb. 2011. 14 pages.

M. Kaustinger et al., "Annotated Facial Landmarks in the Wild: A large-scale, real-world database for facial andmark localization", In 2011 IEEE International Conference on Computer Vision Workshops (ICCV Workshops), 2011. 8 pages.

Chen Li et al., "Intrinsic Face Image Decomposition with Human Face Priors", In ECCV (5), 2014. 16 pages.

Alejandro Newell et al., "Stacked Hourglass Networks for Human Pose Estimation", In Computer Vision—ECCV 2016. 17 pages.

O. M. Parkhi et al., "Deep face recognition", In Proceedings of the British Machine Vision Conference (BMVC), 2015. 12 pages.

S. Patil et al., "Voxel-based representation, display and thickness analysis of intricate shapes", In Ninth International Conference on Computer Aided Design and Computer Graphics (CAD-CG), 2005. 16 pages.

Pascal Paysan et al., "A 3D Face Model for Pose and Illumination Invariant Face Recognition", In Proceedings of the 2009 Sixth IEEE International Conference on Advanced Video and Signal Based Surveillance (AVSS), 2009. 6 pages.

Sami Romdhani et al., "Estimating 3D Shape and Texture Using Pixel Intensity, Edges, Specular Highlights, Texture Constraints and a Prior", In Computer Vision and Pattern Recognition, 2005. 8 pages.

Joseph Roth et al., "Unconstrained 3D Face Reconstruction", In Proc. IEEE Computer Vision and Pattern Recognition, 2015. 10 pages.

Joseph Roth et al., "Adaptive 3D Face Reconstruction from Unconstrained Photo Collections", IEEE Conference on Computer Vision and Pattern Recognition (CVPR), 2016. 14 pages.

C. Sagonas et al., "300 Faces in-the-Wild Challenge: The First Facial Landmark Localization Challenge", In 2013 IEEE International Conference on Computer Vision Workshops, 2013. 7 pages.

Jie Shen et al., "The First Facial Landmark Tracking in-the-Wild Challenge: Benchmark and Results", The Computer Vision Foundation, pp. 50-58, 2015. 9 pages.

Supasorn Suwajanakorn et al., "Total Moving Face Reconstruction", In Computer Vision—ECCV 2014. 17 pages.

J. Thies et al., "Face2Face: Real-Time Face Capture and Reenactment of RGB Videos", In 2016 IEEE Conference on Computer Vision and Pattern Recognition (CVPR), 2016. 9 pages.

Luan Tran et al., "Nonlinear 3D Face Morphable Model", In Proceedings of the 2018 IEEE Conference on Computer Vision and Pattern Recognition (CVPR), 2018. 10 pages.

J. Yang et al., "Go-ICP: A Globally Optimal Solution to 3D ICP Point-Set Registration", IEEE Transactions on Pattern Analysis and Machine Intelligence 38, 11, Nov. 2016. 14 pages.

(56) References Cited

OTHER PUBLICATIONS

J. Yang et al., "Stacked Hourglass Network for Robust Facial Landmark Localisation", In 2017 IEEE Conference on Computer Vision and Pattern Recognition Workshops (CVPRW), 2017. 9 pages.

Hongwen Zhang et al., "Joint Voxel and Coordinate Regression for Accurate 3D Facial Landmark Localization", CoRR abs/1801.09242 (2018). arXiv:1801.09242. 7 pages.

K. Zhang et al., "Joint Face Detection and Alignment Using Multitask Cascaded Convolutional Networks", IEEE Signal Processing Letters 23, 10, Oct. 2016. 5 pages.

Zhanpeng Zhang et al., "Facial Landmark Detection by Deep Multi-task Learning", In Computer Vision—ECCV 2014. 15 pages.

Xiangyu Zhu et al., "Face Alignment Across Large Poses: A 3D Solution", In The IEEE Conference on Computer Vision and Pattern Recognition (CVPR), 2016. 10 pages.

Adrian Bulat et al., "Convolutional aggregation of local evidence for large pose face alignment", Proc. of British Machine Vision Conference, 2016. 12 pages.

V. Blanz et al., "Face recognition based on fitting a 3d morphable model", IEEE Transactions on Pattern Analysis and Machine Intelligence, vol. 25, No. 9, Sep. 2003. 12 pages.

The European Patent Office (EPO) The Extended European Search Report for 19853856 dated Jan. 21, 2022 10 Pages.

Daniel Crispell et al., "Pix2Face: Direct 3D Face Model Estimation," 2017 IEEE International Conference On Computer Vision Workshops (ICCVW), Oct. 22, 2017 (Oct. 22, 2017), pp. 2512-2518 7 pages.

Aaron S Jackson et al., "Large Pose 3D Face Reconstruction from a Single Image via Direct Volumetric CNN Regression," arxiv.org, arXiv:1703.07834v1, Mar. 22, 2017. 10 pages.

* cited by examiner

METHOD AND APPARATUS FOR RECONSTRUCTING THREE-DIMENSIONAL MODEL OF HUMAN BODY, AND STORAGE MEDIUM

RELATED APPLICATIONS

This application claims priority to PCT Application No. PCT/CN2019/090885, filed on Jun. 24, 2019, which claims priority to Chinese Patent Application No. 201810990982.1, filed with the National Intellectual Property Administration, PRC on Aug. 28, 2018 and entitled "METHOD AND APPARATUS FOR RECONSTRUCTING THREE-DIMENSIONAL MODEL OF HUMAN BODY, AND STORAGE MEDIUM". The two applications are both incorporated herein by reference in their entirety.

FIELD OF THE TECHNOLOGY

This application relates to the field of communications technologies, and specifically, to a method and an apparatus for reconstructing a three-dimensional model of a human body, and a storage medium.

BACKGROUND OF THE DISCLOSURE

Three-dimensional model reconstruction is one of the important subjects of research in computer vision and computer graphics, and is one of the fundamental technologies of virtual reality (VR), augmented reality (AR), and mixed reality (MR). Therefore, how to better implement three-dimensional model reconstruction has great significance.

SUMMARY

Embodiments of this application provide a method and an apparatus for reconstructing a three-dimensional model of a human body, and a storage medium, which can improve accuracy of a reconstructed three-dimensional model of a human body and a reconstruction effect.

The embodiments of this application provide a method for reconstructing a three-dimensional model of a human body, performed by a computing device. The method includes obtaining a two-dimensional image of a human body part to be reconstructed; mapping the two-dimensional image to a voxel space, to obtain a voxelized result of the two-dimensional image; obtaining three-dimensional morphable model parameters corresponding to the two-dimensional image based on calculating the voxelized result using a preset three-dimensional parameter regression network; and reconstructing a three-dimensional model of the human body part based on the three-dimensional morphable model parameters.

The embodiments of this application provide an apparatus for reconstructing a three-dimensional model of a human body part. The apparatus includes: a processor and a memory storing computer executable instructions. Upon the processor executing the instructions stored in the memory, the processor is configured to: obtain a two-dimensional image of a human body part to be reconstructed; map the two-dimensional image to a voxel space, to obtain a voxelized result of the two-dimensional image; obtain three-dimensional morphable model parameters corresponding to the two-dimensional image based on calculating the voxelized result using a preset three-dimensional parameter regression network; and reconstruct a three-dimensional model of the human body part based on the three-dimensional morphable model parameters.

The embodiments of this application further provide an apparatus for reconstructing a three-dimensional model of a human body. The apparatus includes an obtaining unit, configured to obtain a two-dimensional image of a human body part to be reconstructed; a mapping unit, configured to map the two-dimensional image to a voxel space, to obtain a voxelized result of the two-dimensional image; a calculation unit, configured to obtain three-dimensional morphable model parameters corresponding to the two-dimensional image by performing calculation on the voxelized result using a preset three-dimensional parameter regression network; and a reconstruction unit, configured to reconstruct a three-dimensional model of the human body part based on the three-dimensional morphable model parameters.

The embodiments of this application further provide a non-transitory computer readable storage medium storing a machine-readable instruction executable by a processor, the machine-readable instruction causing the processor to perform: obtaining a two-dimensional image of a human body part to be reconstructed; mapping the two-dimensional image to a voxel space, to obtain a voxelized result of the two-dimensional image; obtaining three-dimensional morphable model parameters corresponding to the two-dimensional image based on calculating the voxelized result using a preset three-dimensional parameter regression network; and reconstructing a three-dimensional model of the human body part based on the three-dimensional morphable model parameters.

BRIEF DESCRIPTION OF THE DRAWINGS

To describe the technical solutions of the embodiments of this application more clearly, the accompanying drawings required for describing the embodiments are briefly introduced below. Apparently, the accompanying drawings in the following description show some exemplary embodiments of this application, and a person skilled in the art may still derive other drawings from these accompanying drawings without creative efforts.

DESCRIPTION OF EMBODIMENTS

The technical solutions in the embodiments of this application are clearly and completely described below with reference to the accompanying drawings in the embodiments of this application. Apparently, the described embodiments are some exemplary embodiments rather than all of the embodiments of this application. All other embodiments obtained by a person skilled in the art based on the embodiments of this application without creative efforts shall fall within the protection scope of this application.

Often, three-dimensional model reconstruction is mainly implemented by using technologies such as a depth sensor, Structure Lights, and multi-view Stereo Matching. These devices are expensive, and the image acquisition process is complex. In embodiments of the present disclosure, a corresponding three-dimensional model can be reconstructed by using a single two-dimensional image (that is, a geometric structure of an object is restored). A human face is used as an example. Specifically, positions of face feature points may be manually marked on a three-dimensional face morphable model (3DMM), then the face feature points on the three-dimensional morphable model and two-dimensional face feature points on an input picture are aligned by optimizing coefficients corresponding to basis vectors, to obtain a basis vector coefficient combination corresponding to the input picture. According to the basis vector coefficient combination, a three-dimensional model (that is, a three-dimensional model of the face) corresponding to the input picture can be obtained. However, the solution is highly dependent on accurate detection of face feature points. Because partial information loss of a two-dimensional face image due to a side view, an exaggerated facial expression, a blocked view and the like, the solution has relatively low face reconstruction accuracy and an extremely unsatisfactory effect in the cases of a side view, an exaggerated facial expression, a blocked view.

Figure 1A:
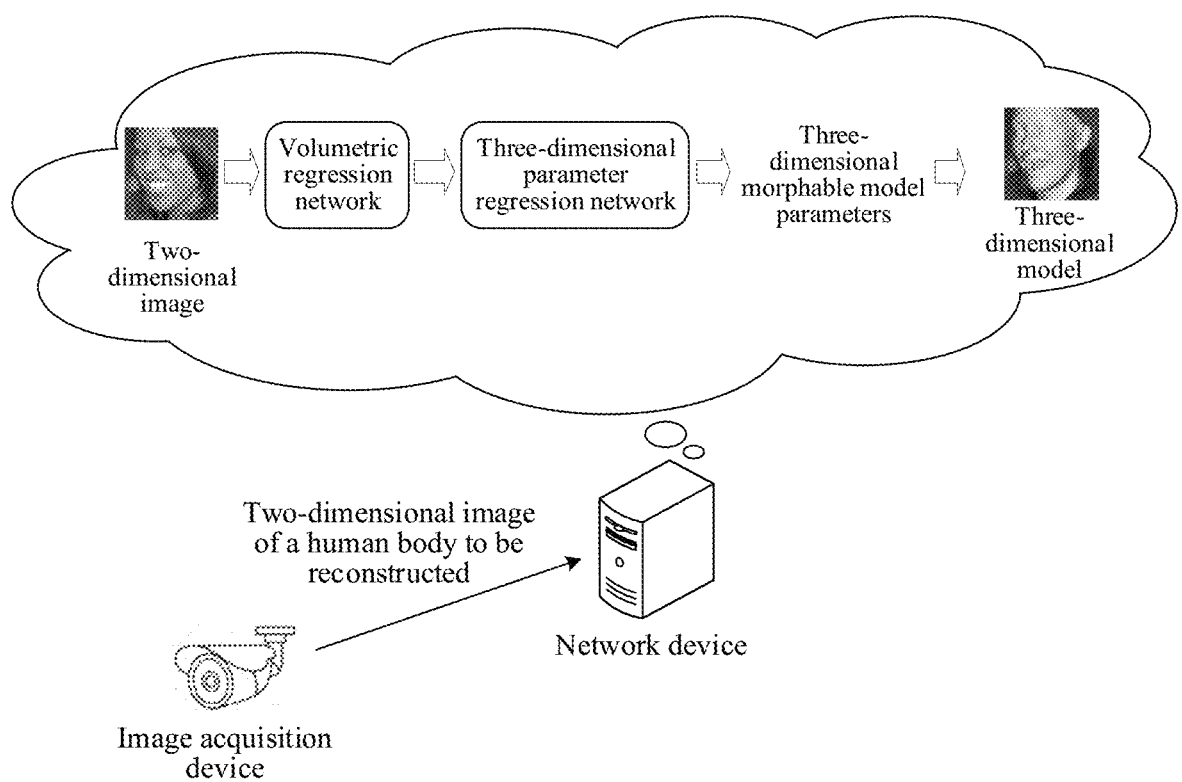
FIG. 1A is a schematic diagram of a scenario of a method for reconstructing a three-dimensional model of a human body according to an embodiment of this application.

The embodiments of this application provide a method and an apparatus for reconstructing a three-dimensional model of a human body, and a storage medium. The apparatus for reconstructing a three-dimensional model of a human body may be specifically integrated into a network device, for example, a computing device such as a terminal or a server. In the present disclosure, a human body is used interchangeably with a human body part. In some embodiments, a human body or a human body part may refer to any part of a human body, such as a head, a face, or a torso of a human body. In some embodiments, a human body or a human body part may also refer to the whole human body. In one embodiment, referring to FIG. 1A, after obtaining a two-dimensional image of a human body to be reconstructed, for example, after receiving a two-dimensional image of a human body to be reconstructed that is sent by an image acquisition device, the network device may map the two-dimensional image to a voxel space. For example, the network device may map the two-dimensional image to a voxel space by using a VRN, to obtain a voxelized result of the two-dimensional image. Then the network device performs calculation on the voxelized result by using a preset three-dimensional parameter regression network, to obtain three-dimensional morphable model parameters corresponding to the two-dimensional image. The network device may reconstruct a three-dimensional model of the human body based on the three-dimensional morphable model parameters. For example, if the two-dimensional image is a face image, a three-dimensional model of the face may be reconstructed based on 3DMM parameters. If the two-dimensional image is a whole human body (including the face and the body) image, a three-dimensional model of the whole human body may be reconstructed based on skinned multi-person linear model (SMPL) parameters.

Detailed descriptions are separately made below. The sequence of the following embodiments is not intended to limit preference orders of the embodiments.

The embodiments of this application are described from the perspective of an apparatus for reconstructing a three-dimensional model of a human body. The apparatus for reconstructing a three-dimensional model of a human body may be specifically integrated into a network device, for example, a computing device such as a terminal or a server. The terminal may specifically include a mobile phone, a tablet computer, a notebook computer, a personal computer (PC), or the like.

An embodiment of this application provides a method for reconstructing a three-dimensional model of a human body, including: obtaining a two-dimensional image of a human body to be reconstructed; mapping the two-dimensional image to a voxel space, to obtain a voxelized result of the two-dimensional image; performing calculation on the voxelized result by using a preset three-dimensional parameter regression network, to obtain three-dimensional morphable model parameters corresponding to the two-dimensional image; and reconstructing a three-dimensional model of the human body based on the three-dimensional morphable model parameters.

Figure 1B:
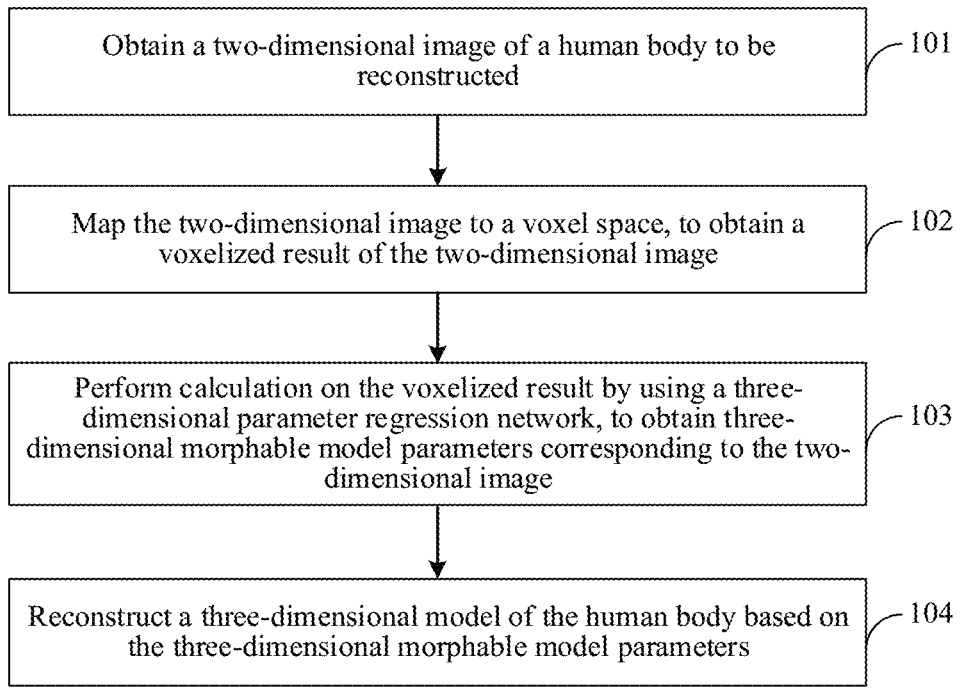
FIG. 1B is a flowchart of a method for reconstructing a three-dimensional model of a human body according to an embodiment of this application.

As shown in FIG. 1B, a specific process of the method for reconstructing a three-dimensional model of a human body may include the following steps:

Step 101: Obtain a two-dimensional image of a human body to be reconstructed.

In one embodiment, a human body image may specifically be acquired by using a local (that is, the apparatus for reconstructing a three-dimensional model of a human body) camera component such as a camera. Or, a human body image sent by another device such as another terminal may be received, and then the human body image is pre-processed, to obtain the two-dimensional image of the human body to be reconstructed.

The pre-processing may include operations such as cropping, resolution adjustment, image size scaling, brightness adjustment, and/or contrast ratio adjustment.

The two-dimensional image of the human body to be reconstructed refers to a two-dimensional image of a human body for which a three-dimensional model needs to be reconstructed. The two-dimensional image of the human body may be a whole human body image (including the face and the body), or may be a partial body image, such as a face image or an image of some parts of the human body.

Step 102: Map the two-dimensional image to a voxel space, to obtain a voxelized result of the two-dimensional image.

A voxel is an abbreviation of a volume pixel. A three-dimensional object including a voxel may be presented by volumetric rendering or extracting an iso-surface of a polygon with a given threshold contour. As its name implies, the voxel is the smallest unit of digital data in three-dimensional space division, and is usually used in fields such as three-dimensional imaging. The voxel space refers to a coordinate space using a voxel as a unit. That is, the mapping the two-dimensional image to a voxel space means projecting the two-dimensional image to a coordinate space using a voxel as a unit, so as to obtain a three-dimensional image (the three-dimensional image may use a voxel as a unit) corresponding to the two-dimensional image. For ease of descriptions, in this embodiment of this application, the three-dimensional image corresponding to the two-dimensional image is referred to as the voxelized result of the two-dimensional image.

The two-dimensional image may be mapped to the voxel space in a plurality of methods, for example, a VRN may be used, and this method specifically includes the following steps:

Obtain a preset VRN; and input the two-dimensional image into the VRN for calculation, to obtain the voxelized result of the two-dimensional image.

The VRN may be obtained by training a plurality of two-dimensional human body samples marked with real voxel values. The VRN may specifically be preset by a maintenance person. Alternatively, the training may be performed by another device or the apparatus for reconstructing a three-dimensional model of a human body. That is, before the step of "obtaining a preset VRN", the method for reconstructing a three-dimensional model of a human body may further include: Collecting a plurality of two-dimensional human body samples (that is, two-dimensional image samples of human bodies) marked with real voxel values; performing calculation on voxels of the two-dimensional human body samples by using a preset stack hourglass network, to obtain predicted voxel values; and converging the predicted voxel values and the real voxel values of the two-dimensional human body samples, to obtain a VRN.

The stack hourglass network may be set according to specific requirements. For example, the stack hourglass network may include a plurality of hourglass networks, for example, two hourglass networks.

Figure 1C:
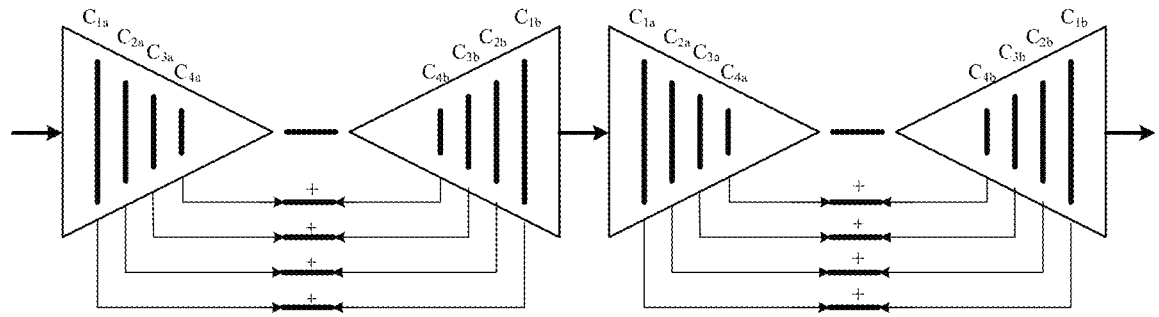
FIG. 1C is an exemplary diagram of a stack hourglass network (volumetric regression network, VRN) according to an embodiment of this application.

In one embodiment, as shown in FIG. 1C, one stack hourglass network may specifically be formed by using two hourglass networks having the same structure. Each hourglass network may include two parts: a left part and a right part. The right part is a mirror image of the left part, and corresponding positions of the left part and the right part may be combined by using a plus sign. For example, if the left part includes four layers: $C_{1a}$, $C_{2a}$, $C_{3a}$, and $C_{4a}$, and the right part may also include four layers: $C_{4b}$, $C_{3b}$, $C_{2b}$, and $C_{1b}$, where $C_{1a}$ and $C_{1b}$, $C_{2a}$ and $C_{2b}$, $C_{3a}$ and $C_{3b}$, and $C_{4a}$ and $C_{4b}$ may be respectively combined by using a plus sign.

After the stack hourglass network is established, calculation may be performed on voxels of the two-dimensional human body samples by using the stack hourglass network, to obtain predicted voxel values, and then the predicted voxel values and the real voxel values of the two-dimensional human body samples are converged, to obtain a VRN. For example, the predicted voxel values and the real voxel values of the two-dimensional human body samples may specifically be converged by using a preset loss function. The loss function $E_V$ corresponding to the VRN may specifically be as follows:

$$E_V = \sum_{w=1}^{W} \sum_{h=0}^{H} \sum_{d=1}^{D} [V_{whd} \log(\hat{V}_{whd}) + (1 - V_{whd}) \log(1 - \hat{V}_{whd})] \quad (1)$$

where w, h, and d are coordinate values of a voxel in the voxel space, and are specifically a width, a height, and a depth; values of W, H, and D may be set according to requirements of specific embodiments; $V_{whd}$ is the real voxel value of the two-dimensional human body sample, and $\hat{V}_{whd}$ is the predicted voxel value of the two-dimensional human body sample.

The real voxel values of the two-dimensional human body samples may be manually marked, or may be automatically marked by the apparatus for reconstructing a three-dimensional model of a human body or another device. For example, after learning is performed by using a convolutional neural network, the real voxel values of the two-dimensional human body samples are marked by using the convolutional neural network. Details are not described herein again.

Step 103: Perform calculation on the voxelized result by using a preset three-dimensional parameter regression network, to obtain three-dimensional morphable model parameters corresponding to the two-dimensional image.

In one embodiment, specifically, a preset three-dimensional parameter regression network may be obtained, and then the voxelized result corresponding to the two-dimensional image of the human body to be reconstructed is imported into the three-dimensional parameter regression network for calculation, to obtain three-dimensional morphable model parameters corresponding to the two-dimensional image of the human body to be reconstructed.

The three-dimensional morphable model parameters may include a shape coefficient ($a_{id}$), a state coefficient ($a_{exp}$), and camera parameters. The shape coefficient refers to a parameter that may represent an inherent shape of an object (for example, a human body), such as a height or weight of a human body, a contour of a human face, and shapes and sizes of five sense organs. The state coefficient refers to a parameter representing a current state of an object (for example, a human body), for example, a standing state or a sitting state, whether a hand of a human body is raised, whether a mouth in a human face is open, whether a human face is smiling or laughing, and whether eyes are open or closed. The camera parameters refer to parameters for establishing a geometric model of camera imaging. During image measurement and machine vision application, to determine a mutual relationship between a three-dimensional geometric position of a point on a surface of a space object and a corresponding point of the space object in an image, it is necessary to establish a geometric model of camera imaging.

The camera parameters may be generally divided into an extrinsic parameter (camera extrinsic matrix) and an intrinsic parameter (camera intrinsic matrix). The extrinsic parameter determines a position and a direction of a camera in a three-dimensional space, and how a real world point (that is, world coordinates) falls into another real world point (that is, camera coordinates) through rotation and translation may be determined according to the extrinsic parameter. The intrinsic parameter refers to a parameter inside the camera, and how the real world point becomes a pixel point under a function of the extrinsic parameter through pinhole imaging and electronic conversion by using a lens of the camera may be learned according to the intrinsic parameter. Using a human body as an example, the camera parameters may include a rotation matrix R corresponding to a direction of the human body and a translation matrix t for mapping the human body to two-dimensional image coordinates. In addition, the camera parameters may further include a scale coefficient f. The scale coefficient is an intrinsic parameter, and the rotation matrix R and the translation matrix t are extrinsic parameters.

Generally, the rotation matrix R may be represented by using three rotation angles in a three-dimensional space: r=(roll, yaw, pitch), where yaw means rotating around a Y axis, pitch means rotating around an X axis, and roll means rotating around a Z axis.

Because the rotation matrix R may be represented by using r=(roll, yaw, pitch), in this embodiment of this application, the camera parameters may include {f, r, t}.

In one embodiment of this application, the three-dimensional parameter regression network may be obtained by training a plurality of three-dimensional human body samples marked with real values of three-dimensional morphable model parameters. The three-dimensional human body samples may be directly collected, or may be obtained through calculation by the VRN according to the two-dimensional human body samples. The three-dimensional parameter regression network may be obtained in a plurality of methods. For example, the three-dimensional parameter regression network may be preset by a maintenance person, or may be pre-trained by another device and then provided to the apparatus for reconstructing a three-dimensional model of a human body. Alternatively, training may be performed by the apparatus for reconstructing a three-dimensional model of a human body.

That is, before the step of "performing calculation on the voxelized result by using a preset three-dimensional parameter regression network", the method for reconstructing a three-dimensional model of a human body may further include: collecting a plurality of three-dimensional human body samples marked with real values of three-dimensional morphable model parameters; performing calculation on the three-dimensional morphable model parameters of the three-dimensional human body samples by using a preset three-dimensional regression network, to obtain predicted values of the three-dimensional morphable model parameters; and converging the real values of the three-dimensional morphable model parameters and the predicted values of the three-dimensional morphable model parameters of the three-dimensional human body samples, to obtain a three-dimensional parameter regression network.

The preset three-dimensional regression network may be set according to requirements of specific embodiments. For example, the preset three-dimensional regression network may be provided as a regression network with 5 three-dimensional convolutional layers, or a regression network with 7 three-dimensional convolutional layers (3Dconv).

Figure 1D:
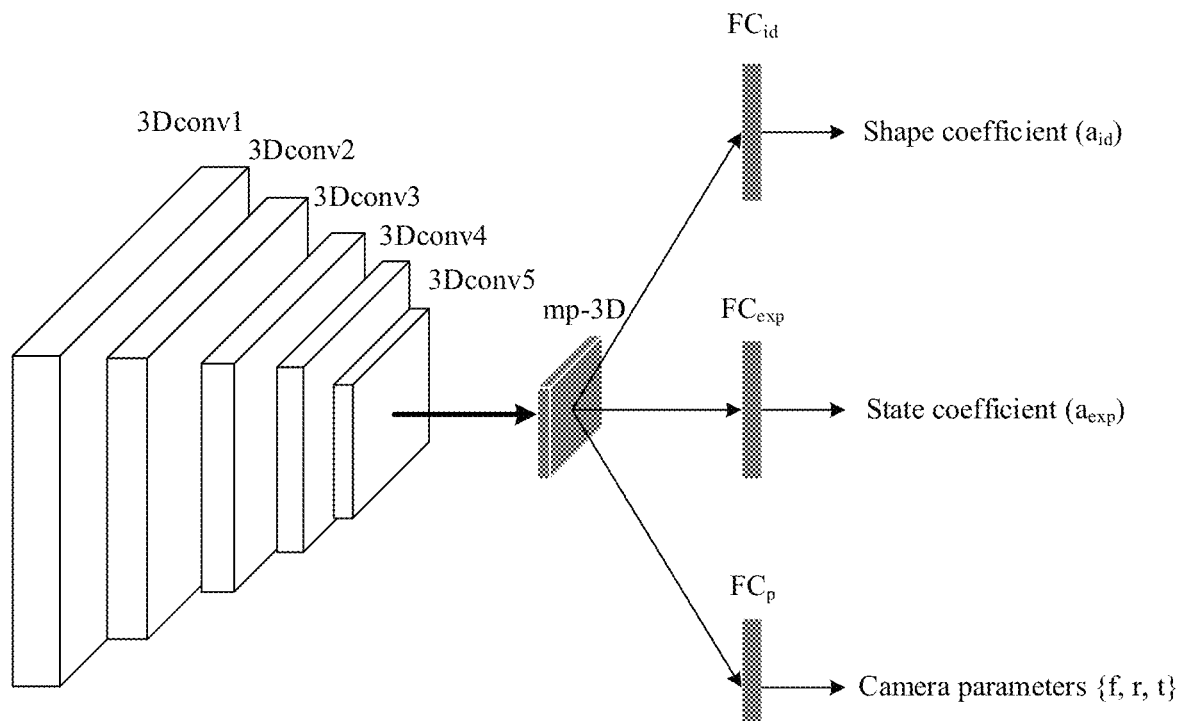
FIG. 1D is an exemplary diagram of a parameter regression network according to an embodiment of this application.

In one embodiment, an example in which the preset three-dimensional regression network is a regression network with 5 three-dimensional convolutional layers is used. Referring to FIG. 1D, the three-dimensional regression network may include 5 three-dimensional convolutional layers: 3Dconv1, 3Dconv2, 3Dconv3, 3Dconv4, and 3Dconv5. In addition, the three-dimensional regression network may further include a pooling layer mp-3D and a fully-connected layer FC. Output of the three-dimensional regression network is "three-dimensional morphable model parameters". Therefore, if the three-dimensional morphable model parameters include a shape coefficient ($a_{id}$), a state coefficient ($a_{exp}$), and camera parameters, after the pooling layer mp-3D, the three-dimensional regression network may be divided into three branches: a shape coefficient branch, a state coefficient branch, and a camera parameter branch. A predicted value of a three-dimensional morphable model parameter that is outputted by the shape coefficient branch is a predicted value of the shape coefficient, a predicted value of a three-dimensional morphable model parameter that is outputted by the state coefficient branch is a predicted value of the state coefficient, and predicted values of three-dimensional morphable model parameters that are outputted by the camera parameter branch are predicted values of the camera parameters.

Accordingly, a corresponding fully-connected layer may be respectively set for each of the branches. For example, the shape coefficient branch corresponds to a fully-connected layer $FC_{id}$, the state coefficient branch corresponds to a fully-connected layer $FC_{exp}$, and the camera parameter branch corresponds to a fully-connected layer $FC_p$.

Figure 1E:
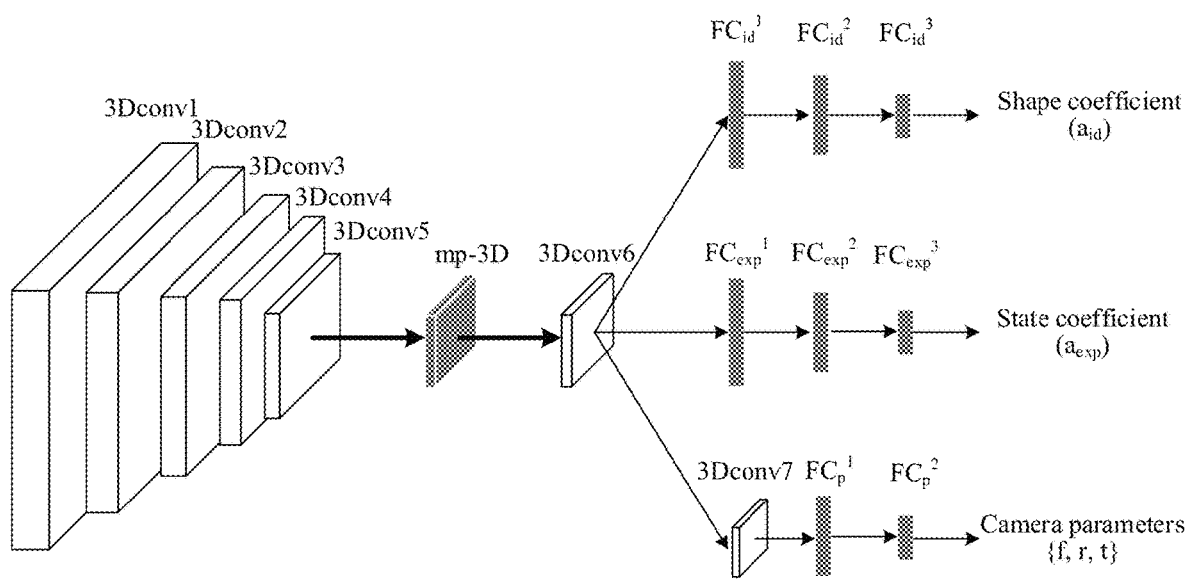
FIG. 1E is another exemplary diagram of a parameter regression network according to an embodiment of this application.

In one embodiment of this application, to improve calculation accuracy, corresponding convolutional layers may further be added to the branches in the three-dimensional regression network. For example, as shown in FIG. 1E, a convolutional layer 3Dconv6 may be added after the pooling layer mp-3D. In one embodiment of this application, a convolutional layer 3Dconv7 may further be added to the camera parameter branch before the fully-connected layer $FC_p$.

In one embodiment of this application, as shown in FIG. 1E, a fully-connected layer of each of the branches may also include a plurality of layers. For example, $FC_{id}$ on the shape coefficient branch may include $FC_{id}^1$, $FC_{id}^2$, and $FC_{id}^3$, $FC_{exp}$ on the state coefficient branch may include $FC_{exp}^1$, $FC_{exp}^2$, and $FC_{exp}^3$.

Sizes and steps of convolution kernels, and padding edges (pooling) of the convolutional layers may all be set according to requirements of specific embodiments. Similarly, parameters of the fully-connected layers may also be set according to requirements of specific embodiments. Details are not described herein again.

After the three-dimensional regression network is established, calculation may be performed on the three-dimensional morphable model parameters of the three-dimensional human body samples by using the three-dimensional regression network, to obtain the predicted values of the three-dimensional morphable model parameters; and then the real values of the three-dimensional morphable model parameters and the predicted values of the three-dimensional morphable model parameters of the three-dimensional human body samples are converged, to obtain the three-dimensional parameter regression network. For example, the real values of the three-dimensional morphable model parameters and the predicted values of the three-dimensional morphable model parameters of the three-dimensional human body samples may specifically be converged by using preset loss functions, and the specific process is as follows:

$$E_{id} = \|S(\hat{a}_{id}, a_{exp}) - S(a_{id}, a_{exp})\|_2^2 = \|U_{id}(\hat{a}_{id} - a_{id})\|_2^2 \quad (2)$$

$$E_{exp} = \|U_{exp}(a_{exp} - \hat{a}_{exp})\|_2^2 \quad (3)$$

$$E_p = \|f^* P^* R^* S(\hat{a}_{id}, \hat{a}_{exp}) + t - \hat{f}^* P^* \hat{R}^* S(\hat{a}_{id}, \hat{a}_{exp}) - \hat{t}\|_2^2 \quad (4)$$

where $E_{id}$ is a loss function corresponding to the shape coefficient branch in the three-dimensional regression network, $E_{exp}$ is a loss function corresponding to the state coefficient branch in the three-dimensional regression network, and $E_p$ is a loss function corresponding to the camera parameter branch in the three-dimensional regression network; $\hat{a}_{id}$ is a predicted value of the shape coefficient, $a_{id}$ is a real value of the shape coefficient, $\hat{a}_{exp}$ is a predicted value of the state coefficient, and $a_{exp}$ is a real value of the state coefficient; $S(\hat{a}_{id},a_{exp})$ is a front-view three-dimensional model constructed based on $\hat{a}_{id}$ and $a_{exp}$, $S(a_{id},a_{exp})$ is a front-view three-dimensional model constructed based on $a_{id}$ and $a_{exp}$, and $S(\hat{a}_{id},\hat{a}_{exp})$ is a front-view three-dimensional model constructed based on $\hat{a}_{id}$ and $\hat{a}_{exp}$; $U_{id}$ is a basis vector matrix of a principal component analysis (PCA) space of a human body shape, and is referred to as a shape basis vector matrix in this embodiment of this application; $U_{exp}$ is a basis vector matrix of a PCA space of a human body state, and is referred to as a state basis vector matrix in this embodiment of this application; f is a scale coefficient (or referred to as scale information) in the camera parameters, $\hat{f}$ is a predicted value of the scale coefficient in the camera parameters, and P is a front-view projection matrix, which, for example, may specifically be $$\begin{bmatrix} 1 & 0 & 0 \\ 0 & 1 & 0 \end{bmatrix};$$

R is a rotation matrix corresponding to the direction of the human body, $\hat{R}$ is a predicted value of the rotation matrix corresponding to the direction of the human body, and both R and $\hat{R}$ may be represented by using three rotation angles r=(roll, yaw, pitch) in a three-dimensional space, where yaw means rotating around the Y axis, pitch means rotating around the X axis, and roll means rotating around the Z axis.

In one embodiment of this application, to improve accuracy of the parameter regression network, the following formula may also be used as the loss function $E_p$ corresponding to the camera parameter branch:

$$E_p = \frac{1}{|F|} \sum_{f_{id} \in F} \left\| f * P * R * S_i(\hat{a}_{id}, \hat{a}_{exp}) + t - \hat{f} * P * \hat{R} * S_i(\hat{a}_{id}, \hat{a}_{exp}) - \hat{t} \right\|_2^2 \quad (5)$$

where F is a set of key points in a three-dimensional image of the human body, and the key points may be set according to requirements of specific embodiments. For example, for a human face, 68 key points in a three-dimensional image may generally be selected as the F; and for a whole human body (including the face and the body), 22 key points in a three-dimensional image may generally be selected as the F.

The real values of the three-dimensional morphable model parameters of the three-dimensional human body samples may be manually marked, or may be automatically marked by the apparatus for reconstructing a three-dimensional model of a human body or another device. For example, after learning is performed by a convolutional neural network, the real values of the three-dimensional morphable model parameters of the three-dimensional human body samples are marked by using the convolutional neural network. Details are not described herein again.

Step 104: Reconstruct a three-dimensional model of the human body based on the three-dimensional morphable model parameters.

In one embodiment, if the three-dimensional morphable model parameters include a shape coefficient, a state coefficient, and camera parameters, the step of "reconstructing a three-dimensional model of the human body based on the three-dimensional morphable model parameters" may include the following steps:

(1) Construct a front-view three-dimensional model of the human body based on the shape coefficient and the state coefficient.

In one embodiment, specifically, a preset average human body model, a preset shape basis vector matrix, and a preset state basis vector matrix may be obtained; and the front-view three-dimensional model of the human body may be constructed according to the average human body model, the shape basis vector matrix, the state basis vector matrix, the shape coefficient and the state coefficient.

The front-view three-dimensional model of the human body may be constructed according to the average human body model, the shape basis vector matrix, the state basis vector matrix, the shape coefficient and the state coefficient in a plurality of methods. For example, a method may specifically be as follows:

adjusting the shape basis vector matrix by using the shape coefficient, to obtain an adjusted shape basis vector matrix; adjusting the state basis vector matrix by using the state coefficient, to obtain an adjusted state basis vector matrix; and calculating a sum of the average human body model, the adjusted shape basis vector matrix, and the adjusted state basis vector matrix, to obtain the front-view three-dimensional model of the human body. This is formulated as follows:

$$S(a_{id},a_{exp}) = \overline{S} + U_{id}a_{id} + U_{exp}a_{exp} \quad (6)$$

where $S(a_{id},a_{exp})$ is a front-view three-dimensional model, $\overline{S}$ is an average human body model, $U_{id}$ is a shape basis vector matrix, $a_{id}$ is a shape coefficient, $U_{exp}$ is a state basis vector matrix, and $a_{exp}$ is a state coefficient.

The average human body model $\overline{S}$, the shape basis vector matrix $U_{id}$, and the state basis vector matrix $U_{exp}$ may all be obtained by collecting a plurality of human body image samples and performing calculation according to a preset algorithm. Certainly, the collected human body image samples are required to belong to the same type as the two-dimensional image of the human body to be reconstructed. For example, if the two-dimensional image of the human body to be reconstructed is a face image, human body image samples to be collected are face image samples, and the average human body model $\overline{S}$ is an average value of front-view three-dimensional models corresponding to the face image samples (referred to as an average face model); if the two-dimensional image of the human body to be reconstructed is a whole human body image (including the face and the body), human body image samples to be collected are overall whole human body image samples, and the average human body model $\overline{S}$ is an average value of front-view three-dimensional models corresponding to the whole human body image samples; and the rest may be deduced by analogy.

(2) Project the front-view three-dimensional model of the human body to an image space according to the camera parameters, to obtain the three-dimensional model corresponding to the human body.

The front-view three-dimensional model of the human body may be projected to the image space in a plurality of methods. For example, the front-view three-dimensional model of the human body may be projected to the image space by using a front-view projection matrix or a weak perspective projection matrix, which are specifically as follows:

A1: Use a Front-View Projection Matrix.

If the camera parameters include the scale coefficient, the translation matrix, and the rotation matrix of the direction of the human body (referred to as a rotation matrix for short), that is, the camera parameters are {f, r, t}, the step of "projecting the front-view three-dimensional model of the human body to an image space according to the camera parameters, to obtain the three-dimensional model corresponding to the human body" may specifically include the following steps: obtaining a preset front-view projection matrix; calculating a product of the front-view projection matrix, the scale coefficient, the rotation matrix, and the front-view three-dimensional model; and calculating a sum of the product and the translation matrix, to obtain the three-dimensional model corresponding to the human body, where the three-dimensional model is expressed by the following formula:

$$V(p)=f*P*R*S+t \tag{7}$$

where V(p) is the three-dimensional model corresponding to the human body, f is the scale coefficient, P is the front-view projection matrix, R is the rotation matrix, and may be represented by using r=(roll, yaw, pitch), S is the front-view three-dimensional model, and t is the translation matrix.

A2: Use a Weak Perspective Projection Matrix.

If the camera parameters include the translation matrix and the rotation matrix of the direction of the human body, that is, the camera parameters are {r, t}, the step of "projecting the front-view three-dimensional model of the human body to an image space according to the camera parameters, to obtain the three-dimensional model corresponding to the human body" may specifically include the following steps:

obtaining a preset weak perspective projection matrix; calculating a product of the weak perspective projection matrix, the rotation matrix, and the front-view three-dimensional model; and calculating a sum of the product and the translation matrix, to obtain the three-dimensional model corresponding to the human body.

The weak perspective projection matrix may be obtained by adjusting the front-view projection matrix, for example, multiplying the front-view projection matrix by the scale coefficient f.

In one embodiment of this application, because the two-dimensional image of the human body to be reconstructed is a picture on which pre-processing such as cropping, resolution adjustment, and/or size scaling has been performed, partial scale information and translation information thereof are lost. As such, accuracy of the scale coefficient f and the translation matrix t still need to be improved. Therefore, to improve accuracy of a reconstructed three-dimensional model, the camera parameters may be optimized. There are a plurality of specific optimization methods. For example, the camera parameters may be optimized by using an iterative nearest neighbor algorithm (also referred to as an iterative closest point (IPC), which is a point cloud matching algorithm that can minimize a distance between two point sets through rotation and translation, to map one image to another image, so that points in the two images that correspond to the same position in a space have a one-to-one correspondence, thus achieving an objective of information fusion), which specifically includes the following steps:

optimizing the camera parameters by using the iterative nearest neighbor algorithm, to obtain optimized camera parameters; and projecting the front-view three-dimensional model of the human body to the image space according to the optimized camera parameters, to obtain the three-dimensional model corresponding to the human body.

The method of projecting the front-view three-dimensional model of the human body to the image space according to the optimized camera parameters is similar to the method of projecting the front-view three-dimensional model of the human body to the image space according to the camera parameters before optimization, and for example, may specifically include the following steps:

B1: Use a Front-View Projection Matrix.

The optimized camera parameters include an optimized scale coefficient, an optimized translation matrix, and an optimized rotation matrix, then the step of "projecting the front-view three-dimensional model of the human body to the image space according to the optimized camera parameters, to obtain the three-dimensional model corresponding to the human body" may include the following steps:

obtaining a preset front-view projection matrix; calculating a product of the front-view projection matrix, the optimized scale coefficient, the optimized rotation matrix, and the front-view three-dimensional model; and calculating a sum of the product and the optimized translation matrix, to obtain the three-dimensional model corresponding to the human body.

B2: Use a Weak Perspective Projection Matrix.

If the camera parameters include an optimized translation matrix and an optimized rotation matrix, and the step of "projecting the front-view three-dimensional model of the human body to the image space according to the optimized camera parameters, to obtain the three-dimensional model corresponding to the human body" may specifically include the following steps:

obtaining a preset weak perspective projection matrix; calculating a product of the weak perspective projection matrix, the optimized rotation matrix, and the front-view three-dimensional model; and calculating a sum of the product and the optimized translation matrix, to obtain the three-dimensional model corresponding to the human body.

After the three-dimensional model corresponding to the human body is obtained, other operations may be subsequently performed based on the three-dimensional model according to requirements of application scenarios. For example, related operations in fields such AR, VR, or MR may be performed.

In this embodiment of this application, a two-dimensional image of a human body to be reconstructed may be obtained; the two-dimensional image is mapped to a voxel space, to obtain a voxelized result of the two-dimensional image; then calculation is performed on the voxelized result by using a preset three-dimensional parameter regression network; and a three-dimensional model of the human body is reconstructed based on the three-dimensional morphable model parameters of the two-dimensional image that are obtained through the calculation. Before the three-dimensional morphable model parameters are calculated, the two-dimensional image may be mapped to the voxel space, so that relative to a solution in which the three-dimensional morphable model parameters are directly calculated according to the two-dimensional image, a problem of relatively low accuracy caused by a loss of two-dimensional image information can be avoided, thereby greatly improving the accuracy and effect of three-dimensional model reconstruction.

To better implement the foregoing method, a detailed description is further made below by using an example.

In this embodiment, a description is made by using an example in which the apparatus for reconstructing a three-dimensional model of a human body is specifically integrated into a network device, and both the VRN and the three-dimensional parameter regression network are trained by the network device.

1. First, the VRN and the three-dimensional parameter regression network need to be trained, which may specifically include the following steps:

(1) Training of the VRN.

The network device may collect a plurality of two-dimensional human body samples. Real voxel values of the two-dimensional human body samples are marked. For example, the real voxel values of the two-dimensional human body samples may be manually marked, or may be automatically marked by the network device or another device. Subsequently, a preset stack hourglass network is trained by using the marked two-dimensional human body samples, and the trained stack hourglass network is the VRN.

For example, the network device may specifically determine a two-dimensional human body sample needing to be trained currently from the plurality of two-dimensional human body samples, then import the two-dimensional human body sample needing to be trained currently into the stack hourglass network for calculation, to obtain a predicted voxel value corresponding to the two-dimensional human body sample needing to be trained currently, and converge the predicted voxel value and the marked real voxel value corresponding to the two-dimensional human body sample needing to be trained currently, to adjust parameters of the stack hourglass network. That is, one training process is completed. Subsequently, the network device may return to perform the step of "determining a two-dimensional human body sample needing to be trained currently from the plurality of two-dimensional human body samples", to update the two-dimensional human body sample needing to be trained currently, and continue to train the VRN. The process is repeated until training of all the two-dimensional human body samples is completed, and then the VRN can be obtained.

A predicted voxel value and a real voxel value of a two-dimensional human body sample may be specifically converged by using the loss function $E_V$ shown in the foregoing formula (1):

$$E_V = \sum_{w=1}^{W} \sum_{h=0}^{H} \sum_{d=1}^{D} [V_{whd} \log(\hat{V}_{whd}) + (1-V_{whd}) \log(1-\hat{V}_{whd})];$$

where w, h, and d are coordinate values of a voxel in the voxel space, and are specifically a width, a height, and a depth; values of W, H, and D may be set according requirements of specific embodiments; and $V_{whd}$ is the real voxel value of the two-dimensional human body sample, and $\hat{V}_{whd}$ is the predicted voxel value of the two-dimensional human body sample.

In one embodiment of this application, the stack hourglass network may be set according to requirements of specific embodiments. For example, the stack hourglass network may include a plurality of hourglass networks, for example, two hourglass networks. For details of a structure of the stack hourglass network, reference may be made to FIG. 1C and the foregoing embodiments. Details are not described herein again.

(2) Training of the Three-Dimensional Parameter Regression Network.

The network device may collect a plurality of three-dimensional human body samples. The three-dimensional human body samples and the two-dimensional human body samples (used for training the VRN) may not be relevant, or may be relevant. For example, outputs of the two-dimensional human body samples after passing through the VRN may be used as corresponding three-dimensional human body samples.

After collecting the plurality of three-dimensional human body samples, the network device may mark real values of three-dimensional morphable model parameters on the three-dimensional human body samples. For example, the real values of the three-dimensional morphable model parameters may be manually marked, or may be automatically marked by the network device or another device. Subsequently, a preset three-dimensional regression network is trained by using the marked three-dimensional human body samples, and the trained three-dimensional regression network is the three-dimensional parameter regression network.

In one embodiment, the network device may specifically determine a three-dimensional human body sample needing to be trained currently from the plurality of three-dimensional human body samples, then import the three-dimensional human body sample needing to be trained currently into the three-dimensional regression network for calculation, to obtain predicted values of three-dimensional morphable model parameters that correspond to the three-dimensional human body sample needing to be trained currently, and converge the predicted values of the three-dimensional morphable model parameters and the marked real values of the three-dimensional morphable model parameters that correspond to the three-dimensional human body sample needing to be trained currently, to adjust parameters of the three-dimensional regression network. That is, one training process is completed. Subsequently, the network device may return to perform the step of "determining a three-dimensional human body sample needing to be trained currently from the plurality of three-dimensional human body samples", to update the three-dimensional human body sample needing to be trained currently, and continue to train the three-dimensional regression network. The process is repeated until training of all the three-dimensional human body samples is completed, and then the three-dimensional parameter regression network can be obtained.

A structure of the preset three-dimensional regression network may be set according to requirements of specific embodiments. For example, the preset three-dimensional regression network may be provided as a regression network with 5 three-dimensional convolutional layers. For the specific structure thereof, reference may be made to FIG. 1D, FIG. 1E, and the foregoing embodiments. Details are not described herein again.

In one embodiment of this application, settings of layers in the three-dimensional regression network may also be flexibly configured according to requirements of specific embodiments. For example, convolutional layers may be set according to parameters shown in Table 1, and fully-connected layers may be set according to parameters shown in Table 2.

TABLE 1

|  |  | 3Dconv1 | 3Dconv2 | 3Dconv3 |
|---|---|---|---|---|
| 3Dconv | Input | 1 × 200 × 192 × 192 | 64 × 100 × 96 × 96 | 128 × 50 × 48 × 48 |
|  | Output | 64 × 100 × 96 × 96 | 128 × 50 × 48 × 48 | 256 × 25 × 24 × 24 |
|  | Convolution kernel step and padding edge (Stride, pad) | 2, 1 | 2, 1 | 2, 1 |
|  | Convolution kernel (Filter Kernel) | 4 × 4 × 4 | 4 × 4 × 4 | 4 × 4 × 4 |

|  |  | 3Dconv4 | 3Dconv5 | 3Dconv6 |
|---|---|---|---|---|
|  | Input | 256 × 25 × 24 × 24 | 512 × 12 × 12 × 12 | 512 × 3 × 3 × 3 |
|  | Output | 512 × 12 × 12 × 12 | 512 × 6 × 6 × 6 | 512 × 3 × 3 × 3 |
|  | Convolution kernel step and padding edge (Stride, pad) | 2, 1 | 2, 0 | 1, 1 |
|  | Convolution kernel (Filter Kernel) | 4 × 4 × 4 | 4 × 4 × 4 | 3 × 3 × 3 |

|  |  | 3Dconv7 |  |  |
|---|---|---|---|---|
|  | Input | 512 × 3 × 3 × 3 | — | — |
|  | Output | 512 × 1 × 1 × 1 | — | — |
|  | Convolution kernel step and padding edge (Stride, pad) | 1, 0 | — | — |
|  | Convolution kernel (Filter Kernel) | 3 × 3 × 3 | — | — |

TABLE 2

|  |  | $FC_{id}$ | $FC_{exp}$ | $FC_p$ |
|---|---|---|---|---|
| $FC^1$ | Input | 512 × 3 × 3 × 3 | 512 × 3 × 3 × 3 | 512 × 1 × 1 × 1 |
|  | Output | 4096 | 4096 | 128 |
| $FC^2$ | Input | 4096 | 4096 | 128 |
|  | Output | 1024 | 1024 | 6 |
| $FC^3$ | Input | 1024 | 1024 | — |
|  | Output | 199 | 29 | — |

The foregoing parameter setting is merely an example. It is to be understood that there may also be other setting methods according to different application scenarios or requirements of application scenarios.

Specifically, the predicted values of the three-dimensional morphable model parameters and the marked real values of the three-dimensional morphable model parameters may be respectively converged by using the loss functions shown in the foregoing formulas (2) to (4):

$$E_{id} = \|S(\hat{a}_{id}, a_{exp}) - S(a_{id}, a_{exp})\|_2^2 = \|U_{id}(\hat{a}_{id} - a_{id})\|_2^2;$$

$$E_{exp} = \|U_{exp}(a_{exp} - \hat{a}_{exp})\|_2^2;$$

$$E_p = \|f*P*R*S(\hat{a}_{id}, \hat{a}_{exp}) + t - \hat{f}*P*\hat{R}*S(\hat{a}_{id}, \hat{a}_{exp}) - \hat{t}\|_2^2;$$

where $E_{id}$ is a loss function corresponding to a shape coefficient branch in the three-dimensional regression network, $E_{exp}$ is a loss function corresponding to a state coefficient branch in the three-dimensional regression network, and $E_p$ is a loss function corresponding to a camera parameter branch in the three-dimensional regression network.

$\hat{a}_{id}$ is a predicted value of a shape coefficient, $a_{id}$ is a real value of a shape coefficient, $\hat{a}_{exp}$ is a predicted value of a state coefficient, and $a_{exp}$ is a real value of a state coefficient; $S(\hat{a}_{id}, a_{exp})$ is a front-view three-dimensional model constructed based on $\hat{a}_{id}$ and $a_{exp}$, $S(a_{id}, a_{exp})$ is a front-view three-dimensional model constructed based on $a_{id}$ and $a_{exp}$, and $S(\hat{a}_{id}, \hat{a}_{exp})$ is a front-view three-dimensional model constructed based on $\hat{a}_{id}$ and $\hat{a}_{exp}$; $U_{id}$ is a shape basis vector matrix; $U_{exp}$ is a state basis vector matrix; f is a scale coefficient (or referred to as scale information) in the camera parameters, $\hat{f}$ is a predicted value of the scale coefficient in the camera parameters, and P is a front-view projection matrix, which, for example, is specifically $$\begin{bmatrix} 1 & 0 & 0 \\ 0 & 1 & 0 \end{bmatrix};$$

R is a rotation matrix corresponding to the direction of the human body, $\hat{R}$ is a predicted value of the rotation matrix corresponding to the direction of the human body, and both R and $\hat{R}$ may be represented by using three rotation angles r=(roll, yaw, pitch) in a three-dimensional space, where yaw means rotating around the Y axis, pitch means rotating around the X axis, and roll means rotating around the Z axis.

In one embodiment of this application, to improve accuracy of the parameter regression network, the formula shown in the foregoing formula (5) may alternatively be used as the loss function $E_p$ corresponding to the camera parameter branch:

$$E_p = \frac{1}{|F|} \sum_{f_{id} \in F} \|f*P*R*S_i(\hat{a}_{id}, \hat{a}_{exp}) + t - \hat{f}*P*\hat{R}*S_i(\hat{a}_{id}, \hat{a}_{exp}) - \hat{t}\|_2^2;$$

where F is a set of key points in a three-dimensional image of the human body, and the key points may be set according to requirements of specific embodiments. For example, for a human face, 68 key points in a three-dimensional image may generally be selected as the F; and for the whole human body (including the face and the body), 22 key points in a three-dimensional image may generally be selected as the F.

2. Three-dimensional model reconstruction may be performed on the two-dimensional image of the human body to be reconstructed by using the trained VRN and the trained three-dimensional parameter regression network.

Figure 2A:
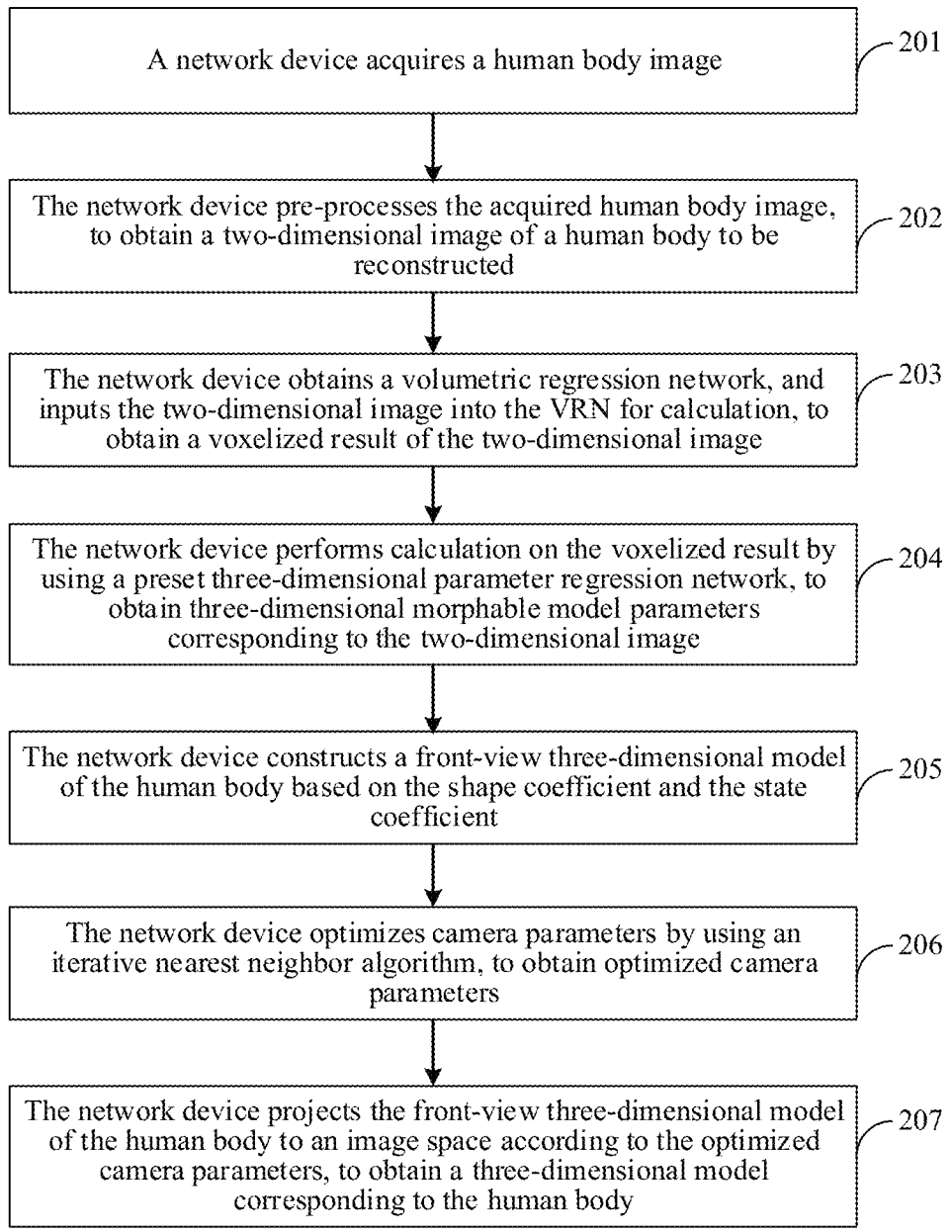
FIG. 2A is another flowchart of a method for reconstructing a three-dimensional model of a human body according to an embodiment of this application.

As shown in FIG. 2A, a specific process of a method for reconstructing a three-dimensional model of a human body may include the following steps:

Step 201: A network device acquires a human body image.

In one embodiment, the network device may specifically acquire a human body image by using a local (that is, the network device) camera component such as a camera, may receive a human body image sent by another device such as another terminal, or the like.

Step 202: The network device pre-processes the acquired human body image, to obtain a two-dimensional image of a human body to be reconstructed.

The pre-processing may include operations such as cropping, resolution adjustment, image size scaling, brightness adjustment, and/or contrast ratio adjustment.

The two-dimensional image of the human body to be reconstructed may be a whole human body image (including the face and the body), or a partial human body image, such as a face image or an image of some parts of the human body, or the like.

Step 203: The network device obtains a VRN, and inputs the two-dimensional image into the VRN for calculation, to obtain a predicted voxel value of the two-dimensional image. In this embodiment of this application, the predicted voxel value of the two-dimensional image is a voxelized result of the two-dimensional image.

Figure 2B:
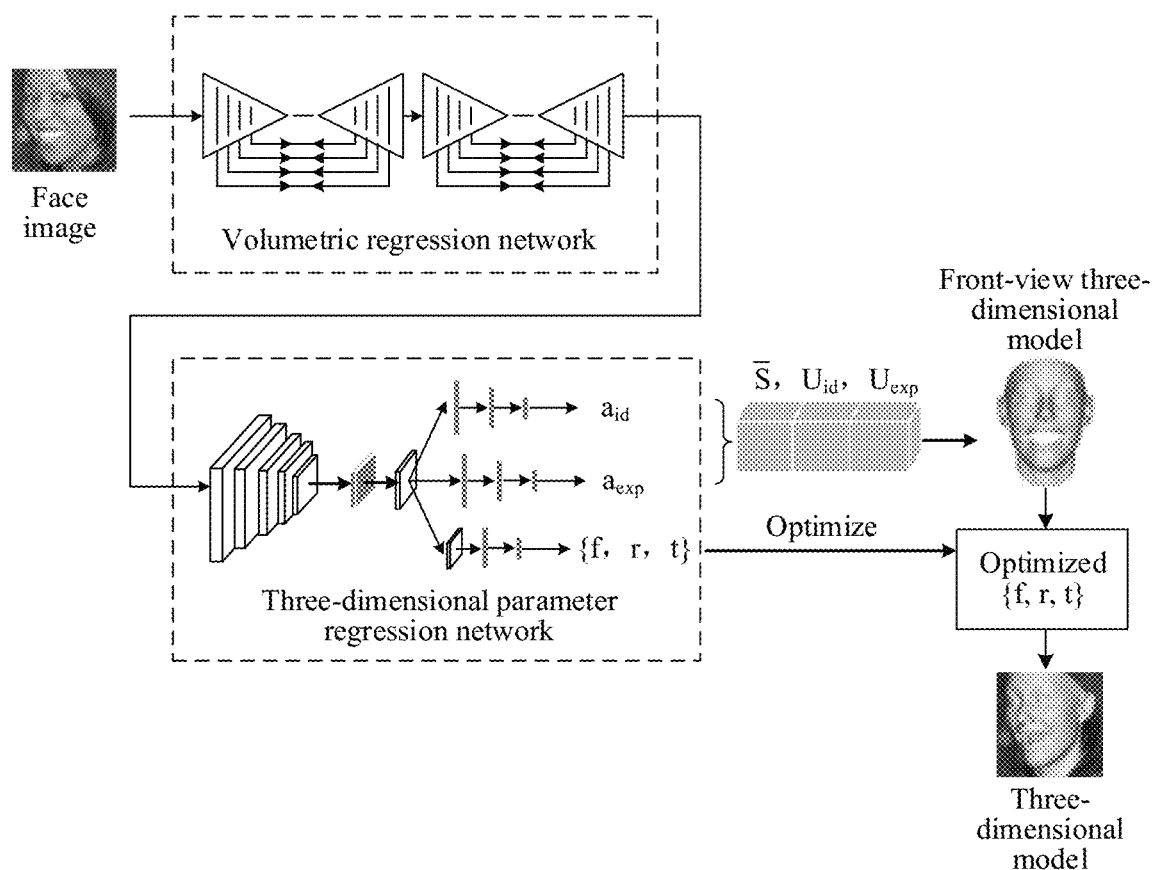
FIG. 2B is a schematic diagram of a method for reconstructing a three-dimensional model of a human body according to an embodiment of this application.

In one embodiment, if the two-dimensional image is a face image, as shown in FIG. 2B, after the VRN is obtained, the face image may be inputted into the VRN for calculation, to obtain a voxelized result about the face image. For example, if the face image is an image 001 in FIG. 2D, the voxelized result may be an image 002 shown in FIG. 2D.

Figure 2C:
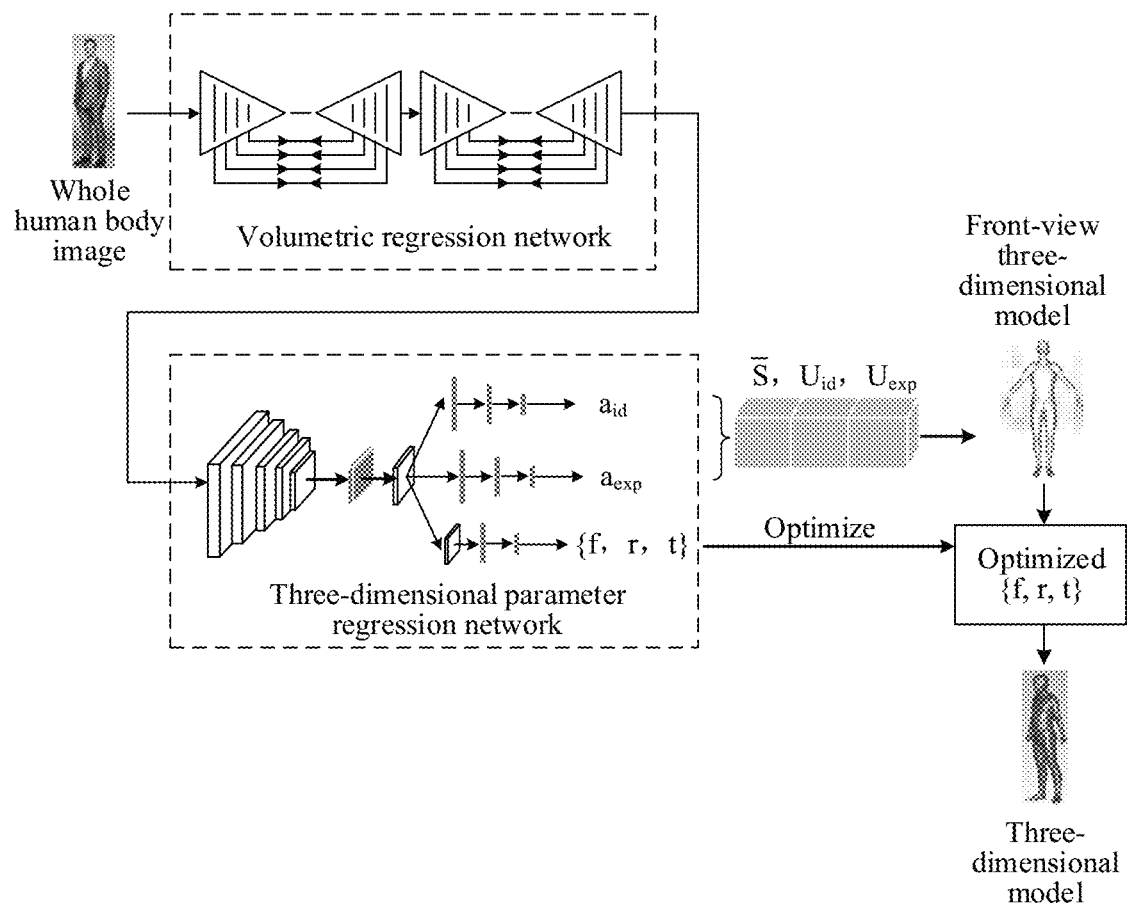
FIG. 2C is another schematic diagram of a method for reconstructing a three-dimensional model of a human body according to an embodiment of this application.
Figure 2D:
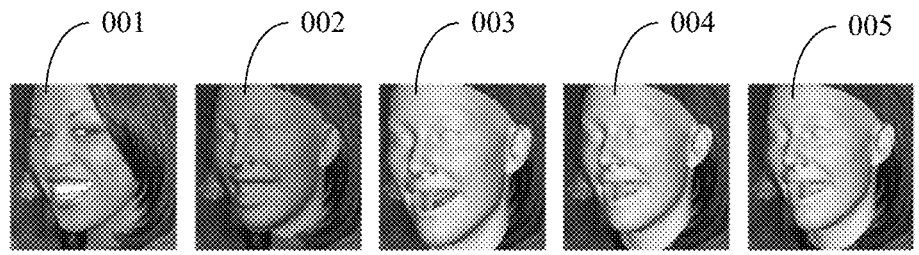
FIG. 2D is a diagram of comparison between three-dimensional reconstruction effects of a face image according to an embodiment of this application.

In another embodiment, if the two-dimensional image is a whole human body image, as shown in FIG. 2C, after the VRN is obtained, the whole human body image may be inputted into the VRN for calculation, to obtain a voxelized result about the whole human body image.

The VRN may be obtained by training a plurality of two-dimensional human body samples marked with real voxel values, and for a specific training method, reference may be made to the foregoing embodiments. Details are not described herein again.

Step 204: The network device performs calculation on the voxelized result by using a preset three-dimensional parameter regression network, to obtain three-dimensional morphable model parameters corresponding to the two-dimensional image.

The three-dimensional morphable model parameters may include a shape coefficient $a_{id}$, a state coefficient $a_{exp}$, and camera parameters. The camera parameters may include a rotation matrix R corresponding to a direction of the human body and a translation matrix t for mapping the human body to two-dimensional image coordinates. In addition, the camera parameters may further include a scale coefficient f Generally, the rotation matrix R may be represented by using three rotation angles r=(roll, yaw, pitch) in a three-dimensional space. That is, the camera parameters may generally include {r, t} or {f, r, t}.

Based on two-dimensional images of different types, the three-dimensional morphable model parameters may be different. For example, if the two-dimensional image is a face image, the three-dimensional morphable model parameters generally refer to 3DMM parameters, where the shape coefficient $a_{id}$ may specifically reflect a contour of the human face, shapes and sizes of five sense organs, and the like; and the state coefficient $a_{exp}$ may reflect an expression of the face, such as a laugh, a smile, open eyes or closed eyes. In another example, if the two-dimensional image is a whole human body image, the three-dimensional morphable model parameters generally refer to SMPL parameters, where the shape coefficient $a_{id}$ may specifically reflect an inherent shape of the human body, such as a height or weight of a human body, and the state coefficient $a_{exp}$ may reflect a current state of the human body, such as a bending condition of the body, or a state of the limbs.

In one embodiment, for example, the two-dimensional image is specifically a face image. Referring to FIG. 2B. The network device may obtain a pre-trained three-dimensional parameter regression network, and then import a voxelized result corresponding to the face image into the three-dimensional parameter regression network for calculation, to obtain three-dimensional morphable model parameters $\{a_{id}, a_{exp}, f, r, t\}$ corresponding to the face image.

In another embodiment, for example, the two-dimensional image is specifically a whole human body image. Referring to FIG. 2C, the network device may obtain a pre-trained three-dimensional parameter regression network, and then import a voxelized result corresponding to the whole human body image into the three-dimensional parameter regression network for calculation, to obtain three-dimensional morphable model parameters $\{a_{id}, a_{exp}, f, r, t\}$ corresponding to the whole human body image.

Step 205: The network device constructs a front-view three-dimensional model of the human body based on the shape coefficient and the state coefficient.

In one embodiment, as shown in FIG. 2B and FIG. 2C, the network device may obtain a preset average human body model $\overline{S}$, a preset shape basis vector matrix $U_{id}$, and a preset state basis vector matrix $U_{exp}$, and subsequently constructs the front-view three-dimensional model of the human body according to the average human body model $\overline{S}$, the shape basis vector matrix $U_{id}$, the state basis vector matrix $U_{exp}$, the shape coefficient $a_{id}$ and the state coefficient $a_{exp}$. For example, the process may specifically include the following steps: adjusting the shape basis vector matrix $U_{id}$ by using the shape coefficient $a_{id}$, to obtain an adjusted shape basis vector matrix; adjusting the state basis vector matrix $U_{exp}$ by using the state coefficient $a_{exp}$, to obtain an adjusted state basis vector matrix; and calculating a sum of the average human body model $\overline{S}$, the adjusted shape basis vector matrix, and the adjusted state basis vector matrix, to obtain the front-view three-dimensional model $S(a_{id}, a_{exp})$ of the human body, which is expressed by the foregoing formula (6):

$$S(a_{id}, a_{exp}) = \overline{S} + U_{id}a_{id} + U_{exp}a_{exp}$$

For example, referring to FIG. 2B, if the two-dimensional image of the human body to be reconstructed is a face image, the front-view three-dimensional model is a three-dimensional model of the front of the face. In another example, referring to FIG. 2C, if the two-dimensional image of the human body to be reconstructed is a whole human body image, the front-view three-dimensional model is a three-dimensional model of the front of the human body. The rest may be deduced by analogy.

The average human body model $\overline{S}$, the shape basis vector matrix $U_{id}$, and the state basis vector matrix $U_{exp}$ may all be obtained by collecting a plurality of human body image samples and performing calculation according to a preset algorithm. Certainly, the collected human body image samples are required to belong to the same type as the two-dimensional image of the human body to be reconstructed. For example, if the two-dimensional image of the human body to be reconstructed is a face image, human body image samples to be collected are face image samples, and the average human body model $\overline{S}$ is an average value of front-view three-dimensional models corresponding to the face image samples (referred to as an average face model); and if the two-dimensional image of the human body to be reconstructed is a whole human body image (including the face and the body), human body image samples to be collected are whole human body image samples, and the average human body model $\overline{S}$ is an average value of front-view three-dimensional models corresponding to the whole human body image samples; and the rest may be deduced by analogy.

Step 206: The network device optimizes the camera parameters by using an iterative nearest neighbor algorithm, to obtain optimized camera parameters.

The camera parameters are optimized because the two-dimensional image inputted into the VRN is an image on which cropping, resolution adjustment, and/or size scaling has been performed. Therefore, partial scale information and translation information thereof are lost. As such, accuracy of the scale coefficient f and the translation matrix t still need to be improved. For example, referring to FIG. 2D, a face image 003 is a three-dimensional model established according to the camera parameters before optimization (that is, the front-view three-dimensional model of the human body is mapped to an image space according to the camera parameters, to obtain a three-dimensional model corresponding to the human body). It can be seen from the figure that compared with the original face image 001, rotation information (rotation matrix r) of the face image 003 is basically accurate, but accuracy of scale information (that is, the scale coefficient f) and translation information (that is, the translation matrix t) of the face image 003 still need to be improved. Therefore, in this case, optimization of the camera parameters, especially scale coefficient f and the translation matrix t, helps improve accuracy of a subsequently reconstructed three-dimensional model.

Step 207: The network device projects the front-view three-dimensional model of the human body to an image space according to the optimized camera parameters, to obtain a three-dimensional model corresponding to the human body.

In one embodiment, for example, the optimized camera parameters include an optimized scale coefficient, an optimized translation matrix, and an optimized rotation matrix (that is, the camera parameters include optimized {f, r, t}). In one embodiment, the network device may specifically obtain a preset front-view projection matrix, calculate a product of the front-view projection matrix, the optimized scale coefficient, the optimized rotation matrix, and the front-view three-dimensional model, and calculate a sum of the product and the optimized translation matrix, to obtain the three-dimensional model corresponding to the human body. The three-dimensional model is expressed by the foregoing formula (7):

$$V(p)=f*P*R*S+t$$

where V(p) is the three-dimensional model corresponding to the human body, f is the optimized scale coefficient, P is the front-view projection matrix, R is the optimized rotation matrix, and may be represented by using r=(roll, yaw, pitch), S is the front-view three-dimensional model, and t is the optimized translation matrix.

Figure 2E:
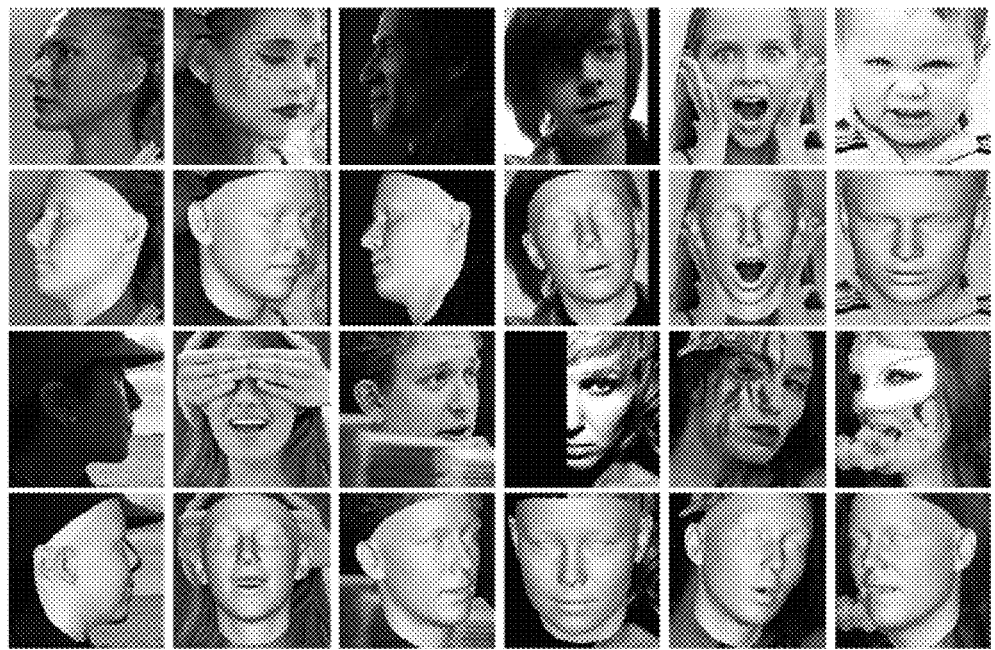
FIG. 2E is an exemplary diagram of a result of a reconstructed three-dimensional model in a method for reconstructing a three-dimensional model of a human body according to an embodiment of this application.

For example, referring to FIG. 2B, a product of the front-view projection matrix P, the optimized scale coefficient f, the optimized rotation matrix R, and the front-view three-dimensional model S of the face image may be calculated; then a sum of the product and the optimized translation matrix t is calculated, to obtain the three-dimensional model corresponding to the face image. For example, specifically referring to an image 004 in FIG. 2D, it can be seen from FIG. 2D that relative to the image 003 (obtained through mapping by using the camera parameters before optimization), the three-dimensional model obtained in this case (obtained through mapping by using the optimized camera parameters) is closer to a real three-dimensional model 005 of the face. For more examples, reference may be made to FIG. 2E. As shown in FIG. 2E, images in the first row and the third row are two-dimensional images of human bodies to be reconstructed, and images in the second row are three-dimensional models that are obtained after three-dimensional model reconstruction is performed on the two-dimensional images in the first row by using the method for reconstructing a three-dimensional model of a human body provided in this embodiment of this application. Similarly, images in the fourth row are three-dimensional models that are obtained after three-dimensional model reconstruction is performed on the two-dimensional images in the third row by using the method for reconstructing a three-dimensional model of a human body provided in this embodiment of this application.

In another example, referring to FIG. 2C, a product of the front-view projection matrix P, the optimized scale coefficient f, the optimized rotation matrix R, and the front-view three-dimensional model S of the whole human body image may be calculated, and then a sum of the product and the optimized translation matrix t is calculated, to obtain the three-dimensional model corresponding to the whole human body image.

In one embodiment of this application, apart from projecting the front-view three-dimensional model of the human body to the image space by using the front-view projection matrix, the front-view three-dimensional model of the human body may alternatively be projected to the image space by using a weak perspective projection matrix. In one embodiment, the process may specifically include the following steps:

The network device may specifically obtain a preset weak perspective projection matrix; calculate a product of the weak perspective projection matrix, the optimized rotation matrix, and the front-view three-dimensional model; and calculate a sum of the product and the optimized translation matrix, to obtain the three-dimensional model corresponding to the human body, where the three-dimensional model is expressed by the following formula:

$$V(p)=K*R*S+t \qquad (8)$$

where V(p) is the three-dimensional model corresponding to the human body, R is the optimized rotation matrix, and may be represented by using r=(roll, yaw, pitch), S is the front-view three-dimensional model, t is the optimized translation matrix, and K is the weak perspective projection matrix. The weak perspective projection matrix K may be obtained by adjusting the front-view projection matrix P, for example, multiplying the front-view projection matrix P by the optimized scale coefficient F.

After the three-dimensional model corresponding to the human body, such as a three-dimensional model of a facial image, is obtained, other operations may be subsequently performed based on the three-dimensional model according to requirements of application scenarios. For example, related operations in fields such AR, VR, or MR may be performed. Details are not described herein again.

After obtaining a two-dimensional image of a human body to be reconstructed, the network device in this embodiment of this application may calculate a voxelized result of the two-dimensional image by using a VRN. The network device may then perform calculation on the voxelized result by using a preset three-dimensional parameter regression network, and reconstruct a three-dimensional model of the human body based on three-dimensional morphable model parameters of the two-dimensional image that are obtained through the calculation. Before the three-dimensional morphable model parameters are calculated, the two-dimensional image may be mapped to the voxel space, so that relative to a solution in which the three-dimensional morphable model parameters are directly calculated according to the two-dimensional image, a problem of relatively low accuracy of three-dimensional model reconstruction caused by a loss of two-dimensional image information can be avoided, thereby greatly improving the accuracy and effect of three-dimensional model reconstruction.

In addition, the camera parameters in the three-dimensional morphable model parameters used in the embodiments of this application are parameters optimized by using the iterative nearest neighbor algorithm, so that scale and translation accuracy of the three-dimensional model can be improved, thereby helping further improve accuracy of the reconstructed three-dimensional model, and making the three-dimensional model be closer to a real three-dimensional model.

To better implement the foregoing embodiment, the embodiments of this application further provide an apparatus for reconstructing a three-dimensional model of a human body. The apparatus for reconstructing a three-dimensional model of a human body may be specifically integrated into a network device, for example, a computing device such as a terminal or a server. The terminal may specifically include a mobile phone, a tablet computer, a notebook computer, a PC, or the like.

Figure 3A:
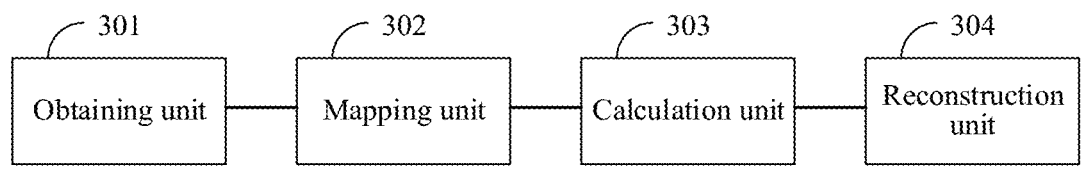
FIG. 3A is a schematic structural diagram of an apparatus for reconstructing a three-dimensional model of a human body according to an embodiment of this application.

In one embodiment, as shown in FIG. 3A, the apparatus for reconstructing a three-dimensional model of a human body may include an obtaining unit 301, a mapping unit 302, a calculation unit 303, and a reconstruction unit 304.

The obtaining unit 301 is configured to obtain a two-dimensional image of a human body to be reconstructed.

In one embodiment, the obtaining unit 301 may specifically acquire a human body image by using a local (that is, the apparatus for reconstructing a three-dimensional model of a human body) camera component such as a camera. The obtaining unit 301 may also receive a human body image sent by another device such as another terminal, and then perform pre-processing such as cropping, resolution adjustment, image size scaling, brightness adjustment, and/or contrast ratio adjustment on the human body image, to obtain the two-dimensional image of the human body to be reconstructed.

The two-dimensional image of the human body to be reconstructed may be a whole human body image (including the face and the body), or a partial human body image, such as a face image or an image of some parts of the human body, or the like.

The mapping unit 302 is configured to map the two-dimensional image to a voxel space, to obtain a voxelized result of the two-dimensional image.

The two-dimensional image may be mapped to the voxel space in a plurality of methods. For example, a VRN may be used.

The mapping unit 302 may be specifically configured to: obtain a preset VRN, and input the two-dimensional image into the VRN for calculation, to obtain the voxelized result of the two-dimensional image.

Figure 3B:
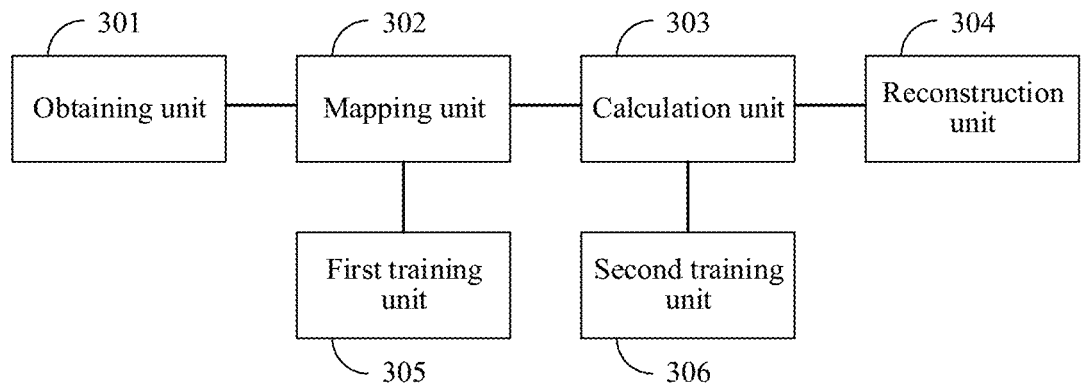
FIG. 3B is another schematic structural diagram of an apparatus for reconstructing a three-dimensional model of a human body according to an embodiment of this application.

The VRN may be obtained by training a plurality of two-dimensional human body samples marked with real voxel values. The VRN may specifically be preset by a maintenance person. Alternatively, the training may be performed by another device or the apparatus for reconstructing a three-dimensional model of a human body. That is, as shown in FIG. 3B, the apparatus for reconstructing a three-dimensional model of a human body may further include a first training unit 305.

The first training unit 305 may be configured to: collect a plurality of two-dimensional human body samples marked with real voxel values; perform calculation on voxels of the two-dimensional human body samples by using a preset stack hourglass network, to obtain predicted voxel values; and converge the predicted voxel values and the real voxel values of the two-dimensional human body samples, to obtain a VRN.

In one embodiment, the mapping unit 302 may be specifically configured to: obtain the VRN obtained by the first training unit 305, and input the two-dimensional image into the VRN for calculation, to obtain the voxelized result of the two-dimensional image.

The stack hourglass network may be set according to requirements of specific embodiments. For example, the stack hourglass network may include a plurality of hourglass networks, for example, two hourglass networks. For details, reference may be made to the foregoing method embodiments. Details are not described herein again.

The calculation unit 303 is configured to perform calculation on the voxelized result by using a preset three-dimensional parameter regression network, to obtain three-dimensional morphable model parameters corresponding to the two-dimensional image.

In one embodiment, the calculation unit 303 may be specifically configured to: obtain a preset three-dimensional parameter regression network, and then import the voxelized result corresponding to the two-dimensional image of the human body to be reconstructed into the three-dimensional parameter regression network for calculation, to obtain three-dimensional morphable model parameters corresponding to the two-dimensional image of the human body to be reconstructed.

The three-dimensional morphable model parameters may include a shape coefficient, a state coefficient, and camera parameters. The camera parameters may include a rotation matrix R (which may be represented by using r=(roll, yaw, pitch)) corresponding to a direction of the human body and a translation matrix t for mapping the human body to two-dimensional image coordinates. In addition, the camera parameters may further include a scale coefficient f.

In one embodiment of this application, the three-dimensional parameter regression network may be obtained by training a plurality of three-dimensional human body samples marked with real values of three-dimensional morphable model parameters. The three-dimensional human body samples may be directly collected, or may be obtained through calculation by the VRN according to the two-dimensional human body samples. The three-dimensional parameter regression network may be obtained in a plurality of methods. For example, the three-dimensional parameter regression network may be preset by a maintenance person, or may be pre-trained by another device and then provided to the apparatus for reconstructing a three-dimensional model of a human body. Alternatively, training may be performed by the apparatus for reconstructing a three-dimensional model of a human body. That is, as shown in FIG. 3B, the apparatus for reconstructing a three-dimensional model of a human body may further include a second training unit 306.

The second training unit 306 may be configured to: collect a plurality of three-dimensional human body samples marked with real values of three-dimensional morphable model parameters; perform calculation on the three-dimensional morphable model parameters of the three-dimensional human body samples by using a preset three-dimensional regression network, to obtain predicted values of the three-dimensional morphable model parameters; and converge the real values of the three-dimensional morphable model parameters and the predicted values of the three-dimensional morphable model parameters of the three-dimensional human body samples, to obtain a three-dimensional parameter regression network.

In one embodiment, the calculation unit 303 may be specifically configured to perform calculation on the voxelized result by using the three-dimensional parameter regression network obtained by the second training unit 306, to obtain three-dimensional morphable model parameters corresponding to the two-dimensional image.

The preset three-dimensional regression network may be set according to requirements of specific embodiments. For example, the preset three-dimensional regression network may be provided as a regression network with 5 three-dimensional convolutional layers, or a regression network with 7 three-dimensional convolutional layers (3Dconv). For details, reference may be made to the foregoing method embodiments. Details are not described herein again.

The reconstruction unit 304 is configured to reconstruct a three-dimensional model of the human body based on the three-dimensional morphable model parameters.

In one embodiment, if the three-dimensional morphable model parameters include a shape coefficient, a state coefficient, and camera parameters, the reconstruction unit 304 may include a construction subunit and a projection subunit.

The construction subunit is configured to construct a front-view three-dimensional model of the human body based on the shape coefficient and the state coefficient.

The projection subunit is configured to project the front-view three-dimensional model of the human body to an image space according to the camera parameters, to obtain the three-dimensional model corresponding to the human body.

In one embodiment, the construction subunit may be specifically configured to: obtain a preset average human body model, a preset shape basis vector matrix, and a preset state basis vector matrix; and construct the front-view three-dimensional model of the human body according to the average human body model, the shape basis vector matrix, the state basis vector matrix, the shape coefficient and the state coefficient.

The front-view three-dimensional model of the human body may be constructed according to the average human body model, the shape basis vector matrix, the state basis vector matrix, the shape coefficient and the state coefficient in a plurality of methods. For example, the construction subunit may be specifically configured to: adjust the shape basis vector matrix by using the shape coefficient, to obtain an adjusted shape basis vector matrix; adjust the state basis vector matrix by using the state coefficient, to obtain an adjusted state basis vector matrix; and calculate a sum of the average human body model, the adjusted shape basis vector matrix, and the adjusted state basis vector matrix, to obtain the front-view three-dimensional model of the human body, where the front-view three-dimensional model is expressed by the foregoing formula (6):

$$S(a_{id}, a_{exp}) = \overline{S} + U_{id} a_{id} + U_{exp} a_{exp};$$

where $S(a_{id}, a_{exp})$ is a front-view three-dimensional model, $\overline{S}$ is an average human body model, $U_{id}$ is a shape basis vector matrix, $a_{id}$ is a shape coefficient, $U_{exp}$ is a state basis vector matrix, and $a_{exp}$ is a state coefficient. The average human body model $\overline{S}$, the shape basis vector matrix $U_{id}$, and the state basis vector matrix $U_{exp}$ may all be obtained by collecting a plurality of human body image samples and then performing calculation according to a preset algorithm. For details, reference may be made to the foregoing method embodiments. Details are not described herein again.

The front-view three-dimensional model of the human body may be mapped to the image space in a plurality of methods. For example, the front-view three-dimensional model of the human body may be projected to the image space by using a front-view projection matrix or a weak perspective projection matrix. For details, reference may be made to the foregoing method embodiments. Details are not described herein again.

In one embodiment of this application, to avoid a problem of a loss of partial scale information and translation information of the two-dimensional image caused by pre-processing, the camera parameters may be optimized, to improve accuracy of the scale information (scale coefficient) and the translation information (translation matrix).

That is, the projection subunit may be specifically configured to: optimize the camera parameters by using an iterative nearest neighbor algorithm, to obtain optimized camera parameters; and project the front-view three-dimensional model of the human body to the image space according to the optimized camera parameters, to obtain the three-dimensional model corresponding to the human body.

The method of projecting the front-view three-dimensional model of the human body to the image space according to the optimized camera parameters is similar to the method of projecting the front-view three-dimensional model of the human body to the image space according to the camera parameters before optimization. For example, the following operations may be performed:

(A) Use a Front-View Projection Matrix.

The optimized camera parameters may include an optimized scale coefficient, an optimized translation matrix, and an optimized rotation matrix.

In one embodiment, the projection subunit is specifically configured to: obtain a preset front-view projection matrix; calculate a product of the front-view projection matrix, the optimized scale coefficient, the optimized rotation matrix, and the front-view three-dimensional model; and calculate a sum of the product and the optimized translation matrix, to obtain the three-dimensional model corresponding to the human body.

(B) Use a Weak Perspective Projection Matrix.

The optimized camera parameters may include an optimized translation matrix and an optimized rotation matrix.

In one embodiment, the projection subunit is specifically configured to: obtain a preset weak perspective projection matrix; calculate a product of the weak perspective projection matrix, the optimized rotation matrix, and the front-view three-dimensional model; and calculate a sum of the product and the optimized translation matrix, to obtain the three-dimensional model corresponding to the human body.

During specific implementation, the foregoing units may be implemented as independent entities, or may be randomly combined, or may be implemented as the same entity or several entities. For specific implementations of the foregoing units, reference may be made to the foregoing method embodiments. Details are not described herein again.

In the apparatus for reconstructing a three-dimensional model of a human body in this embodiment of this application, the obtaining unit 301 may obtain a two-dimensional image of a human body to be reconstructed; the mapping unit 302 maps the two-dimensional image to a voxel space, to obtain a voxelized result of the two-dimensional image; then the calculation unit 303 performs calculation on the voxelized result by using a preset three-dimensional parameter regression network; and the reconstruction unit 304 reconstructs a three-dimensional model of the human body based on three-dimensional morphable model parameters of the two-dimensional image that are obtained through the calculation. Before the three-dimensional morphable model parameters are calculated, the two-dimensional image may be mapped to the voxel space, so that relative to a solution in which the three-dimensional morphable model parameters are directly calculated according to the two-dimensional image, a problem of relatively low accuracy of three-dimensional model reconstruction caused by a loss of two-dimensional image information can be avoided, thereby greatly improving accuracy and effect of three-dimensional model reconstruction.

In addition, the camera parameters in the three-dimensional morphable model parameters used in the apparatus for reconstructing a three-dimensional model of a human body are parameters optimized by using the iterative nearest neighbor algorithm, so that scale and translation accuracy of the three-dimensional model can be improved, thereby helping further improve accuracy of the reconstructed three-dimensional model, and making the three-dimensional model be closer to a real three-dimensional model.

Figure 4:
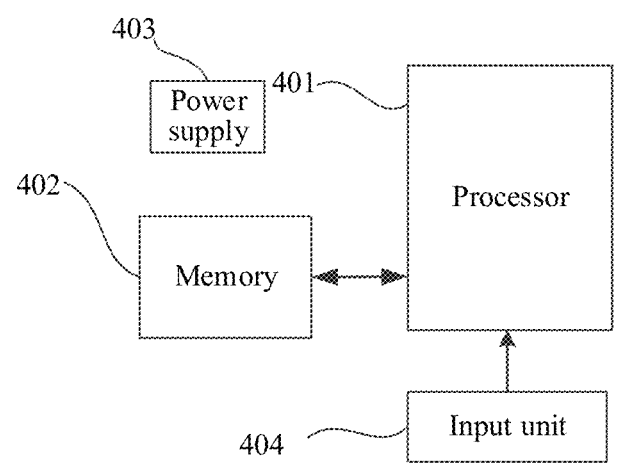
FIG. 4 is a schematic structural diagram of a network device according to an embodiment of this application.

The embodiments of this application further provide a network device, and the network device may be a computing device such as server or a terminal. The network device may integrate the apparatus for reconstructing a three-dimensional model of a human body according to any embodiment of this application. FIG. 4 is a schematic structural diagram of a network device according to an embodiment of this application. Specifically:

The network device may include components such as a processor 401 including one or more processing cores, a memory 402 including one or more computer-readable storage media, a power supply 403, and an input unit 404. A person skilled in the art may understand that the structure of the network device shown in FIG. 4 does not constitute a limitation to the network device, and the network device may include more or fewer components than those shown in the figure, or some components may be combined, or a different component deployment may be used.

The processor 401 is a control center of the network device, and connects various parts of the entire network device by using various interfaces and lines. By running or executing software programs and/or modules stored in the memory 402, and invoking data stored in the memory 402, the processor 401 performs various functions and data processing of the network device, thereby performing overall monitoring on the network device. In one embodiment of this application, the processor 401 may include the one or more processing cores; In one embodiment of this application, the processor 401 may integrate an application processor and a modem processor. The application processor mainly processes an operating system, a user interface, an application program, and the like. The modem processor mainly processes wireless communication. It may be understood that the foregoing modem processor may alternatively not be integrated into the processor 401.

The memory 402 may be configured to store a software program and a module. The processor 401 runs the software program and the module stored in the memory 402, to perform various functional applications and data processing. The memory 402 may mainly include a program storage area and a data storage area. The program storage area may store an operating system, an application program required by at least one function (such as a sound playing function and an image display function), and the like. The data storage area may store data created according to use of the network device, and the like. In addition, the memory 402 may include a high speed random access memory, and may further include a non-volatile memory, such as at least one magnetic disk storage device, a flash memory, or another volatile solid-state storage device. Accordingly, the memory 402 may further include a memory controller, to provide access of the processor 401 to the memory 402.

The network device further includes the power supply 403 for supplying power to the components. In one embodiment of this application, the power supply 403 may be logically connected to the processor 401 by using a power supply management system, thereby implementing functions, such as charging, discharging, and power consumption management, by using the power supply management system. The power supply 403 may further include one or more direct current or alternating current power supplies, a re-charging system, a power failure detection circuit, a power supply converter or inverter, a power supply state indicator, and any other component.

The network device may further include the input unit 404. The input unit 404 may be configured to receive input digit or character information and generate keyboard, mouse, joystick, optical, or trackball signal input related to user settings and function control.

Although not shown in the figure, the network device may further include an output unit, such as a display unit, and the like. The network device may display the reconstructed three-dimensional model of a human body on its display unit. In some cases, the network device may output the reconstructed three-dimensional model of a human body to another software or hardware component. Details are not described herein again. Specifically, in this embodiment, the processor 401 in the network device loads, according to the following instructions, executable files corresponding to processes of one or more application programs into the memory 402. The processor 401 runs the application programs (such a machine-readable instruction for implementing the method for reconstructing a three-dimensional model of a human body provided in any one of the embodiments of this application) stored in the memory 402, to implement the following various functions: obtaining a two-dimensional image of a human body to be reconstructed; mapping the two-dimensional image to a voxel space, to obtain a voxelized result of the two-dimensional image; performing calculation on the voxelized result by using a preset three-dimensional parameter regression network, to obtain three-dimensional morphable model parameters corresponding to the two-dimensional image; and reconstructing a three-dimensional model of the human body based on the three-dimensional morphable model parameters.

In one embodiment, the processor 401 runs an application program stored in the memory 402 to perform the following operations: obtaining a preset VRN; inputting the two-dimensional image into the VRN for calculation, to obtain a voxelized result of the two-dimensional image; then obtaining a preset three-dimensional parameter regression network, and importing the voxelized result corresponding to the two-dimensional image of the human body to be reconstructed into the three-dimensional parameter regression network for calculation, to obtain three-dimensional morphable model parameters corresponding to the two-dimensional image of the human body to be reconstructed, such as a shape coefficient, a state coefficient, and camera parameters; subsequently constructing a front-view three-dimensional model of the human body based on the shape coefficient and the state coefficient; and projecting the front-view three-dimensional model of the human body to an image space according to the camera parameters, to obtain a three-dimensional model corresponding to the human body.

The VRN may be obtained by training a plurality of two-dimensional human body samples marked with real voxel values, and the three-dimensional parameter regression network may be obtained by training a plurality of three-dimensional human body samples marked with real values of three-dimensional morphable model parameters. The VRN and the three-dimensional parameter regression network may be preset by a maintenance person, or may be trained by another device or the network device. That is, the processor 401 may further run an application program stored in the memory 402, to implement the following functions: collecting a plurality of two-dimensional human body samples marked with real voxel values; performing calculation on voxels of the two-dimensional human body samples by using a preset stack hourglass network, to obtain predicted voxel values; and converging the predicted voxel values and the real voxel values of the two-dimensional human body samples, to obtain a VRN; and/or collecting a plurality of three-dimensional human body samples marked with real values of three-dimensional morphable model parameters; performing calculation on the three-dimensional morphable model parameters of the three-dimensional human body samples by using a preset three-dimensional regression network, to obtain predicted values of the three-dimensional morphable model parameters; and converging the real values of the three-dimensional morphable model parameters and the predicted values of the three-dimensional morphable model parameters of the three-dimensional human body samples, to obtain a three-dimensional parameter regression network.

For specific implementations of each of the foregoing operations, reference may be made to the embodiments of the present disclosure. Details are not described herein again.

The network device in this embodiment of this application may obtain a two-dimensional image of a human body to be reconstructed; map the two-dimensional image is mapped to a voxel space, to obtain a voxelized result of the two-dimensional image; then perform calculation on the voxelized result by using a preset three-dimensional parameter regression network; and reconstruct a three-dimensional model of the human body based on three-dimensional morphable model parameters of the two-dimensional image that are obtained through the calculation. Before the three-dimensional morphable model parameters are calculated, the two-dimensional image may be mapped to the voxel space, so that relative to a solution in which the three-dimensional morphable model parameters are directly calculated according to the two-dimensional image, a problem of relatively low accuracy caused by a loss of two-dimensional image information can be avoided, thereby greatly improving accuracy and effect of three-dimensional model reconstruction.

A person of ordinary skill in the art can understand that, all or some steps of the methods of the foregoing embodiments may be implemented through instructions, or implemented through instructions controlling relevant hardware, and the instructions may be stored in a non-transitory computer-readable storage medium and loaded and executed by the processor.

Therefore, the embodiments of this application further provide a storage medium, storing a plurality of instructions capable of being loaded by a processor, to cause the processor to perform the operations in any method for reconstructing a three-dimensional model of a human body according to the embodiments of this application. In one embodiment, when executing the instructions, the processor may perform the following operations: obtaining a two-dimensional image of a human body to be reconstructed; mapping the two-dimensional image to a voxel space, to obtain a voxelized result of the two-dimensional image; performing calculation on the voxelized result by using a preset three-dimensional parameter regression network, to obtain three-dimensional morphable model parameters corresponding to the two-dimensional image; and reconstructing a three-dimensional model of the human body based on the three-dimensional morphable model parameters.

In one embodiment, when executing the instructions, the processor may perform the following operations: obtaining a preset VRN; inputting the two-dimensional image into the VRN for calculation, to obtain a voxelized result of the two-dimensional image; then obtaining a preset three-dimensional parameter regression network, and importing the voxelized result corresponding to the two-dimensional image of the human body to be reconstructed into the three-dimensional parameter regression network for calculation, to obtain three-dimensional morphable model parameters corresponding to the two-dimensional image of the human body to be reconstructed, such as a shape coefficient, a state coefficient, and camera parameters; subsequently constructing a front-view three-dimensional model of the human body based on the shape coefficient and the state coefficient; and projecting the front-view three-dimensional model of the human body to an image space according to the camera parameters, to obtain a three-dimensional model corresponding to the human body.

The VRN may be obtained by training a plurality of two-dimensional human body samples marked with real voxel values, and the three-dimensional parameter regression network may be obtained by training a plurality of three-dimensional human body samples marked with real values of three-dimensional morphable model parameters. The VRN and the three-dimensional parameter regression network may be preset by a maintenance person, or may be trained by another device or the network device. That is, when executing the instructions, the processor may further perform the following operations: collecting a plurality of two-dimensional human body samples marked with real voxel values; performing calculation on voxels of the two-dimensional human body samples by using a preset stack hourglass network, to obtain predicted voxel values; and converging the predicted voxel values and the real voxel values of the two-dimensional human body samples, to obtain a VRN; and/or collecting a plurality of three-dimensional human body samples marked with real values of three-dimensional morphable model parameters; performing calculation on the three-dimensional morphable model parameters of the three-dimensional human body samples by using a preset three-dimensional regression network, to obtain predicted values of the three-dimensional morphable model parameters; and converging the real values of the three-dimensional morphable model parameters and the predicted values of the three-dimensional morphable model parameters of the three-dimensional human body samples, to obtain a three-dimensional parameter regression network.

For specific implementations of each of the foregoing operations, reference may be made to the embodiments of the present disclosure. Details are not described herein again.

The storage medium may include: a read-only memory (ROM), a random access memory (RAM), a magnetic disk, an optical disc, or the like.

Because the instructions stored in the storage medium may perform the steps of any method for reconstructing a three-dimensional model of a human body provided in the embodiments of this application, the instructions can implement beneficial effects that may be implemented by any method for reconstructing a three-dimensional model of a human body in the embodiments of this application. For details, reference may be made to the foregoing embodiments. Details are not described herein again.

The method and the apparatus for reconstructing a three-dimensional model of a human body, and the storage medium provided in the embodiments of this application are described above in detail. Although the principles and implementations of this application are described by using specific embodiments in this specification, the descriptions of the foregoing embodiments are merely intended to help understand the method and the core idea of the method of this application. In addition, a person skilled in the art may make modifications to the specific implementations and application range according to the idea of this application. In conclusion, the content of this specification shall not be construed as a limitation to this application.

What is claimed is:

1. A method for reconstructing a three-dimensional model of a human body part, performed by a computing device, the method comprising:
   obtaining a two-dimensional image of a human body part to be reconstructed;
   mapping the two-dimensional image to a voxel space, to obtain a voxelized result of the two-dimensional image;
   performing calculations on the voxelized result by using a preset three-dimensional parameter regression network, to obtain three-dimensional morphable model parameters corresponding to the two-dimensional image, the three-dimensional morphable model parameters comprising a shape coefficient, a state coefficient, and camera parameters; and
   reconstructing a three-dimensional model of the human body part based on the three-dimensional morphable model parameters, comprising:
      constructing a front-view three-dimensional model of the human body part based on the shape coefficient and the state coefficient; and
      projecting the front-view three-dimensional model of the human body part to an image space according to the camera parameters, to obtain the three-dimensional model corresponding to the human body part.

2. The method according to claim 1, wherein the constructing a front-view three-dimensional model of the human body part based on the shape coefficient and the state coefficient further comprises:
   obtaining a preset average human body part model, a preset shape basis vector matrix, and a preset state basis vector matrix; and
   constructing the front-view three-dimensional model of the human body part according to the average human body part model, the shape basis vector matrix, the state basis vector matrix, the shape coefficient and the state coefficient.

3. The method according to claim 2, wherein the constructing the front-view three-dimensional model of the human body part according to the average human body part model, the shape basis vector matrix, the state basis vector matrix, the shape coefficient and the state coefficient comprises:
   adjusting the shape basis vector matrix based on the shape coefficient, to obtain an adjusted shape basis vector matrix;
   adjusting the state basis vector matrix based on the state coefficient, to obtain an adjusted state basis vector matrix; and
   obtaining the front-view three-dimensional model of the human body part based on a sum of the average human body part model, the adjusted shape basis vector matrix, and the adjusted state basis vector matrix.

4. The method according to claim 1, wherein the projecting the front-view three-dimensional model of the human body part to an image space according to the camera parameters, to obtain the three-dimensional model corresponding to the human body part further comprises:
   optimizing the camera parameters by using an iterative nearest neighbor algorithm; and
   obtaining the three-dimensional model corresponding to the human body part by projecting the front-view three-dimensional model of the human body part to the image space according to the optimized camera parameters.

5. The method according to claim 4, wherein the optimized camera parameters comprise an optimized scale coefficient, an optimized translation matrix, and an optimized rotation matrix, and the obtaining the three-dimensional model corresponding to the human body part by projecting the front-view three-dimensional model of the human body part to the image space according to the optimized camera parameters further comprises:
   obtaining a preset front-view projection matrix;
   calculating a product of the front-view projection matrix, the optimized scale coefficient, the optimized rotation matrix, and the front-view three-dimensional model; and
   obtaining the three-dimensional model corresponding to the human body part based on a sum of the product and the optimized translation matrix.

6. The method according to claim 4, wherein the optimized camera parameters comprise an optimized translation matrix and an optimized rotation matrix, and the obtaining the three-dimensional model corresponding to the human body part by projecting the front-view three-dimensional model of the human body part to the image space according to the optimized camera parameters further comprises:
   obtaining a preset weak perspective projection matrix;
   calculating a product of the weak perspective projection matrix, the optimized rotation matrix, and the front-view three-dimensional model; and obtaining the three-dimensional model corresponding to the human body part based on a sum of the product and the optimized translation matrix.

7. The method according to claim 1, wherein the mapping the two-dimensional image to a voxel space, to obtain a voxelized result of the two-dimensional image further comprises:
   obtaining a preset volumetric regression network (VRN); and
   obtaining the voxelized result of the two-dimensional image by performing calculation on the two-dimensional image using the preset VRN.

8. The method according to claim 7, wherein before the obtaining a preset VRN, the method further comprises:
   collecting a plurality of two-dimensional human body part samples marked with real voxel values;
   obtaining predicted voxel values by performing calculation on voxels of the two-dimensional human body part samples using a preset stack hourglass network; and
   converging the predicted voxel values and the real voxel values of the two-dimensional human body part samples, to obtain the preset VRN.

9. The method according to claim 1, wherein before the calculating the voxelized result using a preset three-dimensional parameter regression network, the method further including:
   collecting a plurality of three-dimensional human body part samples marked with real values of three-dimensional morphable model parameters;
   obtaining predicted values of the three-dimensional morphable model parameters by performing calculation on the three-dimensional morphable model parameters of the three-dimensional human body part samples using a preset three-dimensional regression network; and
   obtaining the preset three-dimensional parameter regression network by converging the real values of the three-dimensional morphable model parameters and the predicted values of the three-dimensional morphable model parameters of the three-dimensional human body part samples.

10. An apparatus for reconstructing a three-dimensional model of a human body part, comprising: a processor and a memory storing computer executable instructions, wherein upon the processor executing the instructions stored in the memory, the processor is configured to:
   obtain a two-dimensional image of a human body part to be reconstructed;
   map the two-dimensional image to a voxel space, to obtain a voxelized result of the two-dimensional image;
   perform calculations on the voxelized result by using a preset three-dimensional parameter regression network, to obtain three-dimensional morphable model parameters corresponding to the two-dimensional image, the three-dimensional morphable model parameters comprising a shape coefficient, a state coefficient, and camera parameters; and
   reconstruct a three-dimensional model of the human body part based on the three-dimensional morphable model parameters, comprising:
      constructing a front-view three-dimensional model of the human body part based on the shape coefficient and the state coefficient; and
      projecting the front-view three-dimensional model of the human body part to an image space according to the camera parameters, to obtain the three-dimensional model corresponding to the human body part.

11. The apparatus according to claim 10, wherein the processor is configured to: obtain a preset average human body part model, a preset shape basis vector matrix, and a preset state basis vector matrix; and construct the front-view three-dimensional model of the human body part according to the average human body part model, the shape basis vector matrix, the state basis vector matrix, the shape coefficient and the state coefficient.

12. The apparatus according to claim 11, wherein the processor is configured to: adjust the shape basis vector matrix by using the shape coefficient, to obtain an adjusted shape basis vector matrix;
   adjust the state basis vector matrix by using the state coefficient, to obtain an adjusted state basis vector matrix; and
   obtain the front-view three-dimensional model of the human body part based on a sum of the average human body part model, the adjusted shape basis vector matrix, and the adjusted state basis vector matrix.

13. The apparatus according to claim 10, wherein the processor is configured to:
   optimize the camera parameters by using an iterative nearest neighbor algorithm; and obtain the three-dimensional model corresponding to the human body part by projecting the front-view three-dimensional model of the human body part to the image space according to the optimized camera parameters.

14. The apparatus according to claim 13, wherein the optimized camera parameters comprise an optimized scale coefficient, an optimized translation matrix, and an optimized rotation matrix; and
   the processor is configured to: obtain a preset front-view projection matrix; calculate a product of the front-view projection matrix, the optimized scale coefficient, the optimized rotation matrix, and the front-view three-dimensional model; and calculate a sum of the product and the optimized translation matrix, to obtain the three-dimensional model corresponding to the human body part.

15. The apparatus according to claim 13, wherein the optimized camera parameters comprise an optimized translation matrix and an optimized rotation matrix; and
   the processor is configured to: obtain a preset weak perspective projection matrix; calculate a product of the weak perspective projection matrix, the optimized rotation matrix, and the front-view three-dimensional model; and calculate a sum of the product and the optimized translation matrix, to obtain the three-dimensional model corresponding to the human body part.

16. The apparatus according to claim 10, wherein the processor is further configured to:
   collect a plurality of two-dimensional human body part samples marked with real voxel values, perform calculation on voxels of the two-dimensional human body part samples by using a preset stack hourglass network, to obtain predicted voxel values, and converge the predicted voxel values and the real voxel values of the two-dimensional human body part samples, to obtain a volumetric regression network (VRN),
   obtain the VRN, and obtain the voxelized result of the two-dimensional image by performing calculation on the two-dimensional image using the VRN.

17. A non-transitory computer readable storage medium storing a machine-readable instruction executable by a processor, the machine-readable instruction causing the processor to perform:

obtaining a two-dimensional image of a human body part to be reconstructed;

mapping the two-dimensional image to a voxel space, to obtain a voxelized result of the two-dimensional image;

performing calculations on the voxelized result by using a preset three-dimensional parameter regression network, to obtain three-dimensional morphable model parameters corresponding to the two-dimensional image, the three-dimensional morphable model parameters comprising a shape coefficient, a state coefficient, and camera parameters; and reconstructing a three-dimensional model of the human body part based on the three-dimensional morphable model parameters, comprising:

constructing a front-view three-dimensional model of the human body part based on the shape coefficient and the state coefficient; and projecting the front-view three-dimensional model of the human body part to an image space according to the camera parameters, to obtain the three-dimensional model corresponding to the human body part.

18. The storage medium according to claim 17, wherein the constructing a front-view three-dimensional model of the human body part based on the shape coefficient and the state coefficient further comprises:

obtaining a preset average human body part model, a preset shape basis vector matrix, and a preset state basis vector matrix; and constructing the front-view three-dimensional model of the human body part according to the average human body part model, the shape basis vector matrix, the state basis vector matrix, the shape coefficient and the state coefficient.

19. The storage medium according to claim 17, wherein the constructing the front-view three-dimensional model of the human body part according to the average human body part model, the shape basis vector matrix, the state basis vector matrix, the shape coefficient and the state coefficient comprises:

adjusting the shape basis vector matrix based on the shape coefficient, to obtain an adjusted shape basis vector matrix;

adjusting the state basis vector matrix based on the state coefficient, to obtain an adjusted state basis vector matrix; and obtaining the front-view three-dimensional model of the human body part based on a sum of the average human body part model, the adjusted shape basis vector matrix, and the adjusted state basis vector matrix.

20. The storage medium according to claim 17, wherein the projecting the front-view three-dimensional model of the human body part to an image space according to the camera parameters, to obtain the three-dimensional model corresponding to the human body part further comprises:

optimizing the camera parameters by using an iterative nearest neighbor algorithm; and obtaining the three-dimensional model corresponding to the human body part by projecting the front-view three-dimensional model of the human body part to the image space according to the optimized camera parameters.

* * * * *